US012723184B2

(12) United States Patent
Yamamoto et al.

(10) Patent No.: US 12,723,184 B2
(45) Date of Patent: Sep. 1, 2026

(54) METHOD FOR MANUFACTURING LAMINATE

(71) Applicant: DOW TORAY CO., LTD., Tokyo (JP)

(72) Inventors: Shinichi Yamamoto, Ichihara (JP); Ryosuke Yamazaki, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 549 days.

(21) Appl. No.: 18/268,221

(22) PCT Filed: Dec. 14, 2021

(86) PCT No.: PCT/JP2021/046092
§ 371 (c)(1),
(2) Date: Jun. 17, 2023

(87) PCT Pub. No.: WO2022/138335
PCT Pub. Date: Jun. 30, 2022

(65) Prior Publication Data

US 2024/0052220 A1 Feb. 15, 2024

(30) Foreign Application Priority Data

Dec. 25, 2020 (JP) ................................ 2020-216207

(51) Int. Cl.
*C09J 183/04* (2006.01)
*C08G 77/00* (2006.01)
(Continued)

(52) U.S. Cl.
CPC ............ *C09J 183/04* (2013.01); *C08G 77/06* (2013.01); *C08G 77/12* (2013.01); *C08G 77/20* (2013.01);
(Continued)

(58) Field of Classification Search
None
See application file for complete search history.

(56) References Cited

U.S. PATENT DOCUMENTS 5,100,976 A 3/1992 Hamada et al.
5,145,886 A 9/1992 Oxman et al.
(Continued)

FOREIGN PATENT DOCUMENTS

AU 618818 B2 1/1992
CN 101151328 A 3/2008
(Continued)

OTHER PUBLICATIONS

Machine assisted English translation of JP2017226724A obtained from https://patents.google.com/patent on Aug. 14, 2024, 14 pages.
(Continued)

*Primary Examiner* — Jeffrey D Washville
(74) *Attorney, Agent, or Firm* — Warner Norcross + Judd LLP

(57) ABSTRACT

Provided is a method of manufacturing a laminate body using a hot-melt curable silicone composition that is compatible with liquid dispensing by a dispenser, has excellent controllability of reaction due to suppressed curing reactivity at the dispensing temperature, wherein the curable silicone composition can be cured at high speed after dispensing. A method of manufacturing a laminate body, including a step of: dispensing a curable silicone composition having hot-melt properties as a whole, a melt viscosity at 100° C. (measured by a flow tester) of 50 Pa·s or less, and curable by irradiation with a high energy beam in a form filled in a dispensing cartridge onto a portion or all of a surface of at least one substrate; and optionally irradiating the composition with a high energy beam to cure the composition.

13 Claims, 1 Drawing Sheet

(51) Int. Cl.

| | |
|---|---|
| ***C08G 77/06*** | (2006.01) |
| ***C08G 77/12*** | (2006.01) |
| ***C08G 77/20*** | (2006.01) |
| ***C09J 5/06*** | (2006.01) |

(52) U.S. Cl.

CPC ................ *C09J 5/06* (2013.01); *C08G 77/70* (2013.01); *C09J 2483/00* (2013.01)

(56) References Cited

U.S. PATENT DOCUMENTS

| | | | | |
|---|---|---|---|---|
| 5,169,727 | A | 12/1992 | Boardman | |
| 5,357,007 | A | 10/1994 | Wengrovius et al. | |
| 5,392,592 | A | 2/1995 | Bozich et al. | |
| 5,977,243 | A | 11/1999 | Barthel et al. | |
| 6,177,506 | B1 | 1/2001 | Takahashi et al. | |
| 6,376,569 | B1 | 4/2002 | Oxman et al. | |
| 6,379,792 | B1 | 4/2002 | Isshiki et al. | |
| 6,433,055 | B1 | 8/2002 | Kleyer et al. | |
| 8,124,689 | B2 | 2/2012 | Loubert et al. | |
| 2002/0132891 | A1 | 9/2002 | Azechi et al. | |
| 2004/0265599 | A1 | 12/2004 | Ushio et al. | |
| 2006/0057779 | A1 | 3/2006 | Sutoh et al. | |
| 2006/0094834 | A1 | 5/2006 | Aoki et al. | |
| 2006/0270788 | A1 | 11/2006 | Ozai et al. | |
| 2008/0319144 | A1 | 12/2008 | Morita et al. | |
| 2009/0042043 | A1 | 2/2009 | Joseph et al. | |
| 2009/0075009 | A1 | 3/2009 | Fujisawa et al. | |
| 2009/0171013 | A1 | 7/2009 | Taguchi et al. | |
| 2009/0281222 | A1 | 11/2009 | Nishiumi et al. | |
| 2011/0104506 | A1 | 5/2011 | Behl et al. | |
| 2011/0236666 | A1 | 9/2011 | Hall et al. | |
| 2012/0139131 | A1 | 6/2012 | Sugo et al. | |
| 2013/0183776 | A1 | 7/2013 | Kashiwagi et al. | |
| 2013/0200554 | A1 | 8/2013 | Mueller | |
| 2013/0274398 | A1 | 10/2013 | Shiobara et al. | |
| 2014/0296468 | A1 | 10/2014 | Kownacka et al. | |
| 2014/0377570 | A1 | 12/2014 | Hirai et al. | |
| 2015/0115311 | A1 | 4/2015 | Yoshida et al. | |
| 2015/0124338 | A1 | 5/2015 | Mayumi et al. | |
| 2015/0183960 | A1 | 7/2015 | Yamazaki et al. | |
| 2015/0315427 | A1 | 11/2015 | Yoshida et al. | |
| 2015/0376482 | A1 | 12/2015 | Bekemeier et al. | |
| 2016/0230005 | A1 | 8/2016 | Mayumi et al. | |
| 2016/0311980 | A1 | 10/2016 | Knoer | |
| 2017/0057980 | A1 | 3/2017 | Boyer et al. | |
| 2017/0058103 | A1 | 3/2017 | Fujisawa et al. | |
| 2017/0092822 | A1 | 3/2017 | Amako et al. | |
| 2017/0166701 | A1 | 6/2017 | Jo et al. | |
| 2017/0283613 | A1 | 10/2017 | Mochizuki | |
| 2017/0355804 | A1 | 12/2017 | Fujisawa et al. | |
| 2018/0105692 | A1 | 4/2018 | Imaizumi et al. | |
| 2018/0208816 | A1 | 7/2018 | Yamazaki et al. | |
| 2018/0305547 | A1 | 10/2018 | Dogen et al. | |
| 2019/0169398 | A1 | 6/2019 | Yamazaki | |
| 2019/0169435 | A1 | 6/2019 | Yamazaki | |
| 2019/0177488 | A1 | 6/2019 | Yamazaki | |
| 2019/0276684 | A1* | 9/2019 | Yamazaki | C09D 183/04 |
| 2019/0367744 | A1 | 12/2019 | Chevalier et al. | |
| 2020/0216671 | A1 | 7/2020 | Matsuzaki et al. | |
| 2020/0224069 | A1 | 7/2020 | Itoh et al. | |
| 2020/0354615 | A1 | 11/2020 | Itoh et al. | |
| 2020/0392335 | A1 | 12/2020 | Yamazaki | |
| 2021/0162704 | A1 | 6/2021 | Sreeram et al. | |
| 2021/0179783 | A1 | 6/2021 | Yoshitake | |
| 2021/0179849 | A1 | 6/2021 | Yoshitake | |
| 2021/0189129 | A1 | 6/2021 | Yamazaki et al. | |
| 2021/0198489 | A1 | 7/2021 | Yoshitake | |
| 2021/0269691 | A1 | 9/2021 | Itoh et al. | |
| 2021/0284888 | A1 | 9/2021 | Itoh et al. | |
| 2021/0292607 | A1 | 9/2021 | Itoh et al. | |
| 2022/0002493 | A1 | 1/2022 | Sugie et al. | |
| 2022/0048230 | A1 | 2/2022 | Imaizumi et al. | |
| 2022/0064447 | A1 | 3/2022 | Yamazaki | |
| 2022/0064491 | A1 | 3/2022 | Yamazaki | |
| 2022/0089872 | A1 | 3/2022 | Fukui et al. | |
| 2022/0169894 | A1 | 6/2022 | Yamazaki et al. | |
| 2022/0186099 | A1 | 6/2022 | Yamazaki et al. | |
| 2022/0195269 | A1 | 6/2022 | Yamazaki | |
| 2022/0340756 | A1* | 10/2022 | Nishijima | B32B 27/34 |
| 2022/0403114 | A1 | 12/2022 | Sugie et al. | |
| 2023/0044439 | A1 | 2/2023 | Yamamoto et al. | |
| 2023/0137947 | A1 | 5/2023 | Yamazaki et al. | |
| 2023/0151215 | A1 | 5/2023 | Yamazaki et al. | |
| 2024/0002605 | A1 | 1/2024 | Tanaka et al. | |
| 2024/0052106 | A1 | 2/2024 | Yamazaki et al. | |
| 2024/0052220 | A1 | 2/2024 | Yamamoto et al. | |

FOREIGN PATENT DOCUMENTS

| | | | | | |
|---|---|---|---|---|---|
| CN | 103849149 | A | | 6/2014 | |
| CN | 104870585 | A | | 8/2015 | |
| CN | 106459419 | A | | 2/2017 | |
| CN | 106715593 | A | | 5/2017 | |
| CN | 107429062 | A | | 12/2017 | |
| CN | 108026373 | A | | 5/2018 | |
| CN | 109844029 | A | | 6/2019 | |
| EP | 1002834 | A1 | | 5/2000 | |
| EP | 3954739 | A1 | | 2/2022 | |
| EP | 4083140 | A1 | | 11/2022 | |
| EP | 4130157 | A1 | | 2/2023 | |
| EP | 4269503 | A1 | | 11/2023 | |
| JP | H0275681 | A | | 3/1990 | |
| JP | H0625602 | A | | 2/1994 | |
| JP | H10195085 | A | | 7/1998 | |
| JP | H11158379 | A | | 6/1999 | |
| JP | H11279182 | A | | 10/1999 | |
| JP | H11335572 | A | | 12/1999 | |
| JP | 2000063681 | A | | 2/2000 | |
| JP | 2000198929 | A | | 7/2000 | |
| JP | 2001019933 | A | | 1/2001 | |
| JP | 2002155261 | A | | 5/2002 | |
| JP | 2003176462 | A | | 6/2003 | |
| JP | 2003226812 | A | | 8/2003 | |
| JP | 2004043814 | A | | 2/2004 | |
| JP | 2004307691 | A | | 11/2004 | |
| JP | 2004315571 | A | | 11/2004 | |
| JP | 2005007331 | A | | 1/2005 | |
| JP | 2006188593 | A | | 7/2006 | |
| JP | 2006274007 | A | | 10/2006 | |
| JP | 2007119768 | A | | 5/2007 | |
| JP | 2007231039 | A | | 9/2007 | |
| JP | 2009503133 | A | | 1/2009 | |
| JP | 2009132797 | A | | 6/2009 | |
| JP | 2009155415 | A | | 7/2009 | |
| JP | 2010047646 | A | | 3/2010 | |
| JP | 2010509088 | A | | 3/2010 | |
| JP | 2011525444 | A | | 9/2011 | |
| JP | 2012017427 | A | | 1/2012 | |
| JP | 2013076050 | A | | 4/2013 | |
| JP | 2013523482 | A | | 6/2013 | |
| JP | 2013147546 | A | | 8/2013 | |
| JP | 2013221075 | A | | 10/2013 | |
| JP | 2013221082 | A | | 10/2013 | |
| JP | 2013222761 | A | | 10/2013 | |
| JP | 2013232580 | A | | 11/2013 | |
| JP | 5385247 | B2 | | 1/2014 | |
| JP | 2014009322 | A | | 1/2014 | |
| JP | 2014221915 | A | | 11/2014 | |
| JP | 2015010132 | A | | 1/2015 | |
| JP | 2015110752 | A | | 6/2015 | |
| JP | 2015214637 | A | | 12/2015 | |
| JP | 2016124967 | A | | 7/2016 | |
| JP | 2017-512224 | A | | 5/2017 | |
| JP | 2017101137 | A | | 6/2017 | |
| JP | 2017520918 | A | | 7/2017 | |
| JP | 2017226724 | A | | 12/2017 | |
| JP | 2018519369 | A | | 7/2018 | |
| JP | 2018177993 | A | | 11/2018 | |
| JP | 2019167832 | A | | 10/2019 | |
| JP | 2019167833 | A | | 10/2019 | |
| JP | 2021107149 | A | | 7/2021 | |
| JP | 2021108319 | A | | 7/2021 | |
| KR | 20190039962 | A | * | 4/2019 | C09D 183/04 |

(56) References Cited

FOREIGN PATENT DOCUMENTS

| | | | |
|---|---|---|---|
| TW | 201439219 | A | 10/2014 |
| WO | 2006104236 | A1 | 10/2006 |
| WO | 2008056810 | A1 | 5/2008 |
| WO | 2013051600 | A1 | 4/2013 |
| WO | 2014002918 | A1 | 1/2014 |
| WO | 2014136805 | A1 | 9/2014 |
| WO | 2015056483 | A1 | 4/2015 |
| WO | 2015126780 | A1 | 8/2015 |
| WO | 2015155949 | A1 | 10/2015 |
| WO | 2016038836 | A1 | 3/2016 |
| WO | 2016103654 | A1 | 6/2016 |
| WO | 20160136243 | A1 | 9/2016 |
| WO | 2017068762 | A1 | 4/2017 |
| WO | 2018028792 | A1 | 2/2018 |
| WO | 2018030286 | A1 | 2/2018 |
| WO | 2018030287 | A1 | 2/2018 |
| WO | 2018030288 | A1 | 2/2018 |
| WO | 2018084012 | A1 | 5/2018 |
| WO | 2018186161 | A1 | 10/2018 |
| WO | 2018235491 | A1 | 12/2018 |
| WO | 2018235492 | A1 | 12/2018 |
| WO | 2019059351 | A1 | 3/2019 |
| WO | 2019078140 | A1 | 4/2019 |
| WO | 2019088067 | A1 | 5/2019 |
| WO | 2019208756 | A1 | 10/2019 |
| WO | 2020090797 | A | 5/2020 |
| WO | 2020090797 | A1 | 5/2020 |
| WO | 2020138055 | A1 | 7/2020 |
| WO | 2020138409 | A1 | 7/2020 |
| WO | 2020138410 | A1 | 7/2020 |
| WO | 2020166692 | A1 | 8/2020 |
| WO | 2020203304 | A1 | 10/2020 |
| WO | 2020203307 | A1 | 10/2020 |
| WO | 2021132710 | A1 | 7/2021 |
| WO | 2021200643 | A1 | 10/2021 |
| WO | 2022004463 | A1 | 1/2022 |
| WO | 2022138336 | A1 | 6/2022 |

OTHER PUBLICATIONS

Machine assisted English translation of JP2003226812A obtained from https://patents.google.com/patent on Aug. 14, 2024, 11 pages.
Machine assisted English translation of JP2010047646A obtained from https://patents.google.com/patent on Aug. 14, 2024, 9 pages.
English translation of International Search Report for PCT/JP2019/042320 dated Mar. 24, 2020, 2 pages.
Machine assisted English translation of JP2010047676A obtained from https://patents.google.com/patent on Jul. 21, 2021, 9 pages.
Machine assisted English translation of JP2015214637A obtained from https://patents.google.com/patent on Jul. 21, 2021, 11 pages.
Machine assisted English translation of JP2017101137A obtained from https://patents.google.com/patent on Jul. 21, 2021, 11 pages.
Machine assisted English translation of CN103849149A obtained from https://worldwide.espacenet.com/patent on Jan. 22, 2024, 11 pages.
Machine assisted English translation of JPH11158379A obtained from https://worldwide.espacenet.com/patent on Nov. 9, 2023, 11 pages.
Machine assisted English translation of CN106715593A obtained from https://patents.google.com/patent on Mar. 14, 2023, 26 pages.
Machine assisted English translation of JP2005007331A obtained from https://patents.google.com/patent on Mar. 14, 2023, 15 pages.
Machine assisted English translation of JP2004315571A obtained from https://patents.google.com/patent on Mar. 14, 2023, 15 pages.
Machine assisted English translation of JP2015010132A obtained from https://patents.google.com/patent on Mar. 14, 2023, 22 pages.
Machine assisted English translation of JP2004307691A obtained from https://patents.google.com/patent on Mar. 14, 2023, 11 pages.
Machine assisted English translation of JP2013222761A obtained from https://patents.google.com/patent on Mar. 15, 2023, 20 pages.
Machine assisted English translation of JP2018177993A obtained from https://patents.google.com/patent on Mar. 15, 2023, 36 pages.
International Search Report for PCT/JP2019/051394 dated Mar. 17, 2020, 2 pages.
Machine assisted English translation of WO2018235492A1 obtained from https://patents.google.com/patent on Oct. 4, 2021, 20 pages.
Machine assisted English translation of JP2016124967A obtained from https://patents.google.com/patent on Oct. 4, 2021, 18 pages.
Machine assisted English translation of WO2016038836A1 obtained from https://patents.google.com/patent on Oct. 4, 2021, 18 pages.
Machine assisted English translation of WO2013051600A1 obtained from https://patents.google.com/patent on Oct. 4, 2021, 25 pages.
Machine assisted English translation of JP2007231039A obtained from https://patents.google.com/patent on Oct. 5, 2021, 7 pages.
International Search Report for PCT/JP2019/051393 dated Mar. 17, 2020, 3 pages.
International Search Report for PCT/JP2019/051392 dated Mar. 17, 2020, 2 pages.
International Search Report for PCT/JP2019/051391 dated Mar. 13, 2020, 3 pages.
International Search Report for PCT/JP2020/012028 dated Jun. 9, 2020, 3 pages.
Machine assisted English translation of JP2013221082A obtained from https://patents.google.com/patent on Oct. 27, 2021, 14 pages.
Machine assisted English translation of WO2020138410A1 obtained from https://patents.google.com/patent on Oct. 27, 2021, 19 pages.
Machine assisted English translation of WO2020138409A1 obtained from https://patents.google.com/patent on Oct. 27, 2021, 24 pages.
Machine assisted English translation of JP11335572A obtained from https://patents.google.com/patent on Oct. 27, 2021, 7 pages.
Machine assisted English translation of JPH11279182A obtained from https://patents.google.com/patent on Oct. 27, 2021, 8 pages.
Machine assisted English translation of JP2003176462A obtained from https://patents.google.com/patent on Oct. 27, 2021, 11 pages.
Machine assisted English translation of JP2009132797A obtained from https://patents.google.com/patent on Oct. 27, 2021, 9 pages.
Machine assisted English translation of JP2012017427A obtained from https://patents.google.com/patent on Oct. 27, 2021, 13 pages.
Machine assisted English translation of JP2000063681A obtained from https://patents.google.com/patent on Oct. 28, 2021, 8 pages.
International Search Report for PCT/JP2020/012027 dated Jun. 9, 2020, 3 pages.
International Search Report for PCT/JP2020/012030 dated Jun. 9, 2020, 2 pages.
International Search Report for PCT/JP2020/012029 dated Jun. 9, 2020, 3 pages.
International Search Report (with English translation) for PCT/JP2020/049074 dated Mar. 23, 2021, 7 pages.
Machine assisted English translation of JPH0625602 obtained from https://patents.google.com/patent on Nov. 11, 2022, 6 pages.
Machine assisted English translation of JP2019167832 obtained from https://patents.google.com/patent on Nov. 11, 2022, 11 pages.
Machine assisted English translation of JP2019167833 obtained from https://patents.google.com/patent on Nov. 11, 2022, 9 pages.
International Search Report (with English translation) for PCT/JP2021/012840 dated Jun. 15, 2021, 6 pages.
English translation of International Search Report for PCT/JP2022/046146 dated Jan. 31, 2023, 2 pages.
Machine assisted English translation of JP2021108319A obtained from https://worldwide.espacenet. com/patent on Mar. 12, 2024, 73 pages.
Machine assisted English translation of WO2020138055A1 obtained from https://worldwide.espacenet.com/patent on Apr. 7, 2024, 43 pages.
Machine assisted English translation of JP2014221915A obtained from <https://patents.google.com/patent> on Nov. 20, 2024, 17 pages.
English translation of International Search Report for PCT/JP2021/046092 dated Feb. 8, 2022, 2 pages.
English translation of International Search Report for PCT/JP2021/046093 dated Mar. 15, 2022, 2 pages.

(56) References Cited

OTHER PUBLICATIONS

Dowsiltm EA-4600 Silicone Adhesive Application Guide for PCT Device Assemblies (Dow Toray Co., Ltd. publication, Form No. 1-3497-42-1120 S2D, 2020).
Machine assisted English translation of JPH10195085A obtained from https://patents.google.com/patent on Jan. 22, 2025, 10 pages.
Machine assisted English translation of WO2019208756A1 obtained from https://worldwide.espacenet.com/patent on Dec. 21, 2023, 32 pages.

* cited by examiner

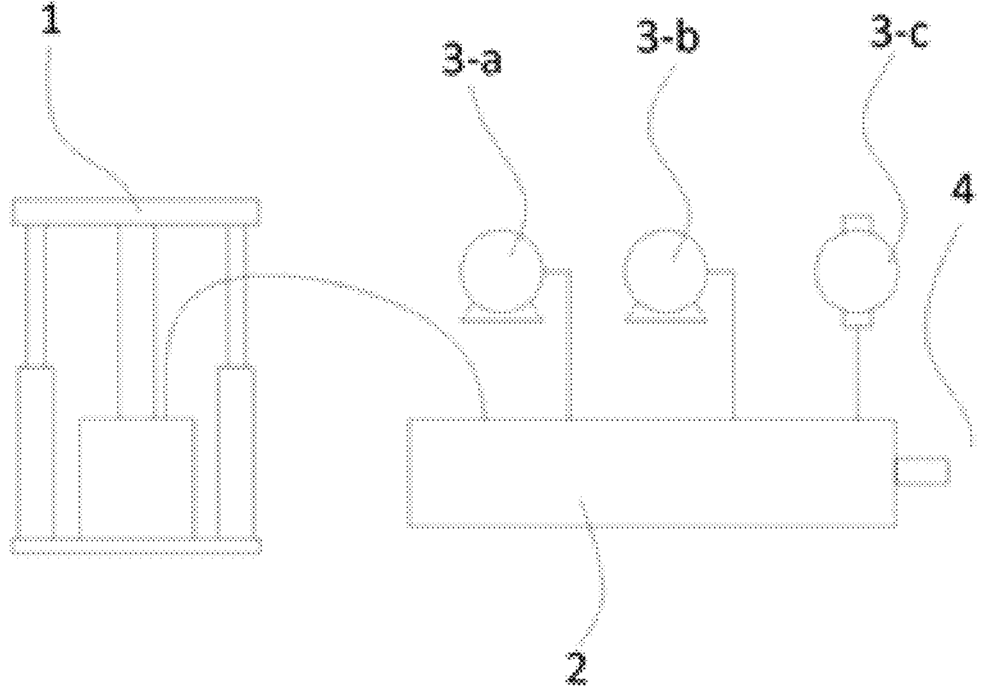
1
3-a
3-b
3-c
4
2

METHOD FOR MANUFACTURING LAMINATE

CROSS-REFERENCE TO RELATED APPLICATIONS

This application is the U.S. National Stage of PCT/JP2021/046092 filed on 14 Dec. 2021, which claims priority to Japanese Patent Application No. 2020-216207 filed on 25 Dec. 2020, the content of which is incorporated herein by reference.

TECHNICAL FIELD

The present invention relates to a method of manufacturing a laminate body (for example, one or more selected from electronic components, semiconductor devices and optical semiconductor devices, or a precursor thereof) including a step of dispensing a hot-melt curable silicone composition, that is solid at room temperature but is cured using irradiation with a high energy beam as a trigger, onto a substrate in a form filled in a dispensing cartridge. Furthermore, the present invention relates to the aforementioned method of manufacturing a laminate body, wherein the dispensed curable silicone composition is in an uncured state or in a semi-cured/cured state due to irradiation with a high energy beam.

BACKGROUND ART

Curable silicone compositions can be cured to form cured products having excellent heat resistance, cold resistance, electrical insulation, weather resistance, water repellency, and transparency, and are utilized in a wide range of industrial fields. In general, a cured product of such a curable silicone composition is less prone to discoloration compared with other organic materials, and has reduced deterioration of physical properties over time, and therefore is also suitable as an encapsulant or adhesive for optical materials and semiconductor devices.

In recent years, hot-melt curable silicone compositions have become increasingly popular from the viewpoint of ease of handling and cost reduction. For example, hot-melt curable silicone compositions in tablet and sheet forms have been proposed in Patent documents 1 to 3. Although these curable silicone compositions have excellent meltability and curability/moldability as encapsulants, recent production processes for semiconductors and the like may require liquid dispensing/application by dispensers, for the adhesives/sealants for semiconductors and electronic components. Therefore there is a problem that it is not possible to flexibly change the application form of curable silicone compositions to suit the adhesive or encapsulating/sealing form in forms such as tablets, or the like.

On the other hand, Non-Patent Document 1 proposes the use of a hot-melt curable silicone composition product (DOWSIL™ EA-4600 silicone adhesive) dispensed by a heated dispenser. However, the curable silicone composition products are room temperature curable and require a curing time of approximately 7 days, and thus there is a problem that they cannot sufficiently adapt to short curing processes during production of semiconductors and the like and for the demand for a cured product with high hardness and low tack. Furthermore, hot-melt curable silicone compositions require constant heating during heating and melting, but may not cure at the desired timing because the curing reaction begins to progress upon heating, which causes a problem with controllability of the reaction.

Therefore, there is demand for a method of manufacturing a semiconductor device or the like using a curable silicone composition which can be used as an adhesive/sealant for semiconductor devices or electronic components in the production process of semiconductor devices or the like, that is compatible with liquid dispensing by a dispenser, is excellent in storage stability, is suitable for a hot dispensing method, and has excellent controllability of the curing reaction.

PRIOR ART DOCUMENTS

Patent Documents

[Patent Document 1] International Patent Publication WO 2016/136243
[Patent Document 2] Japanese Unexamined Patent Application 2014-009322
[Patent Document 3] Japanese PCT Application 2017-512224
[Non-Patent Document 1] DOWSIL™ EA-4600 Silicone Adhesive Application Guide for PCB Device Assemblies (Dow Toray Co., Ltd. publication, Form No. 11-3497-42-1120 S2D, 2020).

SUMMARY OF THE INVENTION

Problem to be Solved by the Invention

In order to resolve the problems described above, an object of the present invention is to provide a method of manufacturing a laminate body using a hot-melt curable silicone composition that is compatible with liquid dispensing by a dispenser and has excellent controllability of reaction due to suppressed curing reactivity at the dispensing temperature, wherein the curable silicone composition can be cured at high speed after dispensing.

Means for Solving the Problem

As a result of intensive studies, the present inventors have found that the composition as a whole has hot-melt properties and has a melt viscosity at 100° C. (measured by a flow tester: nozzle diameter of 1 mm, pressure of 2.5 MPa) that is equal to or less than 50 Pa·s. The present inventors have found that the above-described problems can be solved by a method of manufacturing a laminate body including a step of dispensing a curable silicone composition which is cured by irradiation with a high energy beam in a form filled in a dispensing cartridge, a pail, or a drum onto a portion or all of surfaces of at least one substrate, thereby completing the present invention.

Dispensing cartridges, pails, or drums can be heated to 50° C. or higher by a dispenser or the like equipped with a heating unit and then dispensing is performed onto a substrate to form a laminate body that is a semiconductor precursor or electronic component precursor. Furthermore, at an arbitrary timing, the dispensed curable silicone composition may be irradiated with high energy beams, such as ultraviolet light or the like, directly or through other substrates to advance the curing reaction. Furthermore, the laminate body including two or more substrates may be formed by closely attaching the laminate body to another substrate (external force may be applied to deform the shape of the silicone composition).

Effect of the Invention

The present invention provides a method of manufacturing a laminate body using a hot-melt curable silicone composition that can be dispensed stably by a dispenser or the like onto a substrate by heating, for example, to 50° C. or higher the hot-melt curable silicone composition, which has the property of curing by irradiation with a high energy beam, used in a form filled in a dispensing cartridge, pail, or drum, while on the other hand, the curing reactivity is suppressed at the dispensing temperature; therefore, reaction control is excellent, and the composition can be cured by irradiation with a high energy beam such as ultraviolet light or the like as a trigger, and thus the hot-melt curable silicone composition can be cured at high speed at a low temperature of 100° C. or less. Furthermore, a flexible process can be designed by selecting arbitrary timing after dispensing, and irradiating with a high energy beam. In addition, the curable silicone composition according to the present invention has shape retention at room temperature, and therefore does not drip after sealing or thermocompression bonding to a substrate, by dispensing the composition and curing into a desired shape on the substrate using a hot dispensing process to form a sealant or encapsulant, and if necessary, the composition can also be used as an adhesive layer by pressing with a second substrate and then curing, and thus the composition is applicable for manufacturing a wide variety of laminate bodies.

In particular, the manufacturing method of a laminate body according to the present invention can provide a laminate body with a cured layer obtained by curing a curable silicone composition as an encapsulant/sealant to protect the substrate. Furthermore, it is possible to provide a laminate body (in the case of two substrates, a double-sided adhesive application) containing the curable silicone composition cured and adhered between the substrates by a relatively hard adhesive layer. In addition, by curing the curable silicone composition in a state of close attachment (including pressure bonding) to the substrate that will be the adherend, if necessary, it is possible to provide a laminate body with a cured product layer having the composition as the adhesive layer between the substrates.

BRIEF DESCRIPTION OF THE DRAWINGS

FIG. 1 is a schematic diagram of a twin-screw extruder used in the Examples.

MODE FOR CARRYING OUT THE INVENTION

Embodiments of the present invention will be described below in detail. In the present specification, room temperature generally refers to a range of 15 to 30° C., particularly 18 to 25° C., and atmospheric pressure refers to the atmospheric pressure in the environment where the curable silicone composition of the present invention is handled in a laboratory, factory, or the like, normally around 1 atm (1013.25 hPa).

Furthermore, with the present invention, unless otherwise stated, "having hot-melt properties" means that the entire composition has a high viscosity (including a raw rubber-like state in which plasticity can be measured) or is in a solid state to the extent that the shape can be retained at 25° C., but has a melt viscosity in the range described later at 100° C., and the material is softened and becomes fluid upon heating. Conversely, "not having hot-melt properties" means that the composition or component (solid organopolysiloxane resin or the like) does not exhibit heating and melting behavior independently at 200° C. or lower, and specifically means that the component does not have a softening point or melt viscosity at a temperature of 200° C. or lower.

[Laminate Body]

The laminate body obtained by the present invention is a laminate body provided with a curable silicone composition or cured product thereof (including semi-cured products in which a curing reaction is in progress and fully cured products, the same hereinafter unless otherwise explicitly stated) described later on a portion or all of the surface of at least one substrate. The term "laminate body" broadly includes a laminate body containing a plurality of substrates, with the curable silicone composition or cured product thereof between at least two substrates. Suitably, these laminate bodies are one or more selected from, but not limited to, electronic components, semiconductor devices or optical semiconductor devices, or precursors thereof.

[Laminate Body With Uncured Curable Silicone Composition]

The curable silicone composition according to the present invention has shape retention properties at room temperature, and the curing reaction is triggered by irradiation of high energy rays, and therefore a laminate body with a curable silicone composition that has not cured but retains a certain shape on a substrate can be used as a laminate body with a curable layer having a specific shape that is triggered by irradiation with a high energy beam, and therefore is useful as a precursor for electronic components, semiconductor devices, or optical semiconductor devices. Note that the curable layer containing the curable silicone composition in an uncured state can function as a bonding layer between two or more members as an adhesive layer by irradiating a high energy beam either directly or through another substrate while the curable layer is closely attached to the other substrate (including a form where the shape of the curable layer is changed by applying pressure using external force) such that the curing reaction proceeds. Therefore, the laminate body with a curable layer containing the curable silicone composition in an uncured state between two or more substrates is useful as a precursor for electronic components, semiconductor devices, or optical semiconductor devices that require adhesion/bonding processes between the substrates.

[Laminate body With Cured/Semi-cured Product Containing Curable Silicone Composition]

The cured product obtained by curing the curable silicone composition according to the present invention does not easily cause dripping problems during curing and can provide a relatively hard cured product; therefore, the laminate body with the cured product obtained by curing the curable silicone composition on a substrate is useful as an electronic component, semiconductor device, or optical semiconductor device. Note that the curable silicone composition according to the present invention undergoes a curing reaction triggered by irradiation with a high energy beam, but can be handled in a semi-cured state while the curing reaction is in progress by controlling the curing reaction conditions (particularly curing temperature), and thus, depending on the overall design of the laminate body or design of the process, it is also possible to design a laminate body with a semi-cured product on the substrate, which is applicable to flexible laminate body manufacturing processes. For example, in a laminate body with a cured product containing the curable silicone composition between two or more substrates, the uncured curable silicone composition may be irradiated with a high energy beam in advance, and the composition, which has shape retention at room temperature and is in a state in which the curing reaction is in progress, may be closely attached to the other substrate (including a form of pressure using external force to change the shape of the semi-cured product layer) and then the curing reaction may proceed completely. Alternatively, a laminate body with a curable layer made of uncured curable silicone composition between two or more substrates may be formed without irradiation with a high energy beam and then the cure reaction may be advanced by irradiating the composition with a high energy beam directly or through another substrate to form a laminate body with a cured product (adhesive layer or bonding layer) between two or more substrates.

[Function of Layer According to Curable Silicone Composition]

The functions of the curable layer made of curable silicone composition and the cured layer cured from the composition are not particularly limited in the laminate body, but are suitable as adhesive layers, potting agent layers, protective agent layers, coating agent layers, sealant layers, encapsulant layers, stress buffer layers, and if the curable silicone composition contains a functional filler, or the like, the composition can be used as an optical, electrical or thermal functional layer, and can also be used as a reflective layer, conductive/insulating layer, heat dissipation layer, heat transfer layer, and the like. The method of manufacturing the laminate body of the present invention is particularly suitable for use as a sealant layer, which requires shape retention after dispensing, or as an encapsulant layer for semiconductors, where a thick layer is required, and coating at a precise thickness can be applied by dispensing, applying to the substrate, and returning to room temperature particularly when the outlet of the dispenser is connected to a heated slot die to form a film or sheet of the desired thickness. Furthermore, the curable silicone composition (uncured or semi-cured composition layer) is closely attached to a substrate and suitably crushed by an external force between two substrates to form a film that can be used as an adhesive layer or a stress buffer layer between two substrates with different coefficients of linear expansion.

[Laminate Body Manufacturing Method]

The manufacturing method of the laminate body of the present invention includes a step of dispensing a curable silicone composition that combines specific hot-melt properties and curing properties triggered by high energy beam irradiation, in a form filled in a dispensing cartridge, onto a portion or all of the surface of at least one substrate.

More specifically, the method of manufacturing the laminate body of the present invention includes a step of dispensing a curable silicone composition, that has hot-melt properties of the overall composition, has a melt viscosity at 100° C. of 50 Pa·s or less (measured by a flow tester: nozzle diameter 1 mm, pressure 2.5 MPa), and is cured by irradiation by a high energy beam, in the form filled in a dispensing cartridge, pail, or drum, onto a portion or all of a surface of at least one substrate. The melt viscosity of the curable silicone composition is preferably 40 Pa·s or less, more preferably 30 Pa·s or less. Note that when the melt viscosity is 50 Pa or higher at 100° C., heating at high temperature is required for smooth dispensing, and the composition may be unstable during the dispensing step.

In greater detail, the method of manufacturing the laminate body according to the present invention includes:

Step (1): a step of heating a curable silicone composition filled in a dispensing cartridge, pail, or drum to 50° C. or higher to impart fluidity; and Step (2): a step of dispensing the curable silicone composition of step (1) on a portion or all of the surface of at least one substrate using a dispenser.

Herein, the obtained laminate body contains the curable silicone composition on the substrate, and the presence or absence of curing by irradiation with a high energy beam and the presence or absence of close attachment or adhesion to another substrate can be arbitrarily selected based on subsequent processes.

The method of manufacturing a laminate body according to the present invention preferably involves curing the curable silicone composition by irradiation with a high energy beam, and includes:

Step (1): a step of heating a curable silicone composition filled in a dispensing cartridge, pail, or drum to 50° C. or higher to impart fluidity;

Step (2): a step of dispensing the curable silicone composition of step (1) onto a portion or all of the surface of at least one substrate using a dispenser;

Step (3): a step of irradiating the curable silicone composition dispensed from the dispenser with a high energy beam, either at the same time as step (2) or after step (2); and Step (4): a step of curing the curable silicone composition either at the same time as step (3) or after step (3).

Herein, the obtained laminate body includes a cured product obtained by curing the curable silicone composition on the substrate.

The method of manufacturing a laminate body according to the present invention may be a method of manufacturing a laminate body containing a curable silicone composition or a cured product thereof between two or more substrates, and preferably, in the aforementioned steps, the irradiation with the high energy beam in step (3) is a step of irradiating the curable silicone composition with the high energy beam, either directly or through another substrate, and Step (5): after step (2), but before step (4), is a step of closely attaching the curable silicone composition dispensed from the dispenser to another substrate.

Note that the aforementioned step (5) is a step of closely attaching another substrate into to the curable silicone composition dispensed from the dispenser onto the substrate in the step (2) in a uncured state or in a semi-cured state in which the curing reaction is proceeding by applying an external force, and may be a step accompanied by a change in the shape of the dispensed curable silicone composition.

Next, each step will be described below.

[Step (1)]

Step (1) is a step of heating a curable silicone composition filled in a dispensing cartridge, pail, or drum to 50° C. or higher to impart fluidity. The composition is solid or plastic at room temperature, but as described above, the melt viscosity at 100° C. as measured by a flow tester is 50 Pa·s or less, and thus hot dispensing is possible. The set temperature in this step depends on the melt viscosity of the composition, and can be set to a temperature in a range of 50 to 150° C., and preferably in a range of 80 to 120° C., at which the composition can easily be dispensed. Note that if the temperature is too high, the stability of the composition may be impaired during the dispensing step.

Step (1) is preferably a step in which the curable silicone composition in the form filled in a dispensing cartridge, pail, or drum is heated to 50° C. or higher using a dispenser equipped with a heating unit to provide fluidity. The dispenser can be a hot dispenser equipped with a commonly distributed heating unit (for example, a temperature control unit). As described above, the curable silicone composition of the present invention has melting properties at 50° C. Therefore, if the cartridge is heated to 50° C. or higher, suitably 50 to 150° C., and preferably 80 to 120° C. by a temperature control unit, the composition can be smoothly dispensed at a dispensing pressure of approximately 0.5 MPa, for example, and thus can be used for hot dispensing. Alternatively, if the container is a pail or drum, a Nordson hot melter can be used to extrude and dispense the product while heating to 50° C. or higher.

[Step (2)]

Step (2) is a step of extruding the composition from the container and applying the composition by dispensing to a portion or all of the surface of the substrate (including electronic components or the like, or a precursor thereof). In this step, a general automatic type or hand gun type dispenser can be used. The shape and diameter of the nozzle of the dispensing port and the dispensing pressure are preferably optimized depending on the viscosity of the composition at the dispensing temperature. Furthermore, jet dispensing is also possible by optimizing the shape of the nozzle of the dispensing port and the dispensing speed. On the other hand, the composition can be dispensed in a film or sheet form controlled to a desired thickness by connecting a heatable slot die to the tip end of the dispenser.

The composition of the present invention has shape retention at 25° C.; therefore, the dispensed material does not change shape due to dripping or the like. Therefore, the pattern of application of the composition is arbitrary and may involve patterning on the substrate surface or filling in groove portions or other irregularities on the substrate surface. In addition, when the aforementioned slot die application method is used, the composition applied to the substrate is naturally cooled, so the thickness will not easily change, resulting in a coating controlled to a precise thickness. Furthermore, a layer with a precisely controlled thickness can be formed by passing the composition applied from a dispenser through a heatable roller or the like.

[Step (3)]

Step (3) is a step in which the curable silicone composition dispensed from the dispenser is irradiated with a high energy beam to make curable, and the high energy beam may be ultraviolet rays, gamma rays, X-rays, alpha rays, electron beams, and the like. In particular, examples include ultraviolet rays, X-rays, and electron beams irradiated from a commercially available electron beam irradiating device. Of these, ultraviolet rays are preferable from the perspective of efficiency of catalyst activation, and ultraviolet rays within a wavelength range of 280 to 380 nm are preferable from the perspective of industrial use. Furthermore, the irradiation dose varies depending on the type of high energy beam activated catalyst, but in the case of ultraviolet light, the integrated irradiation dose at a wavelength of 365 nm is preferably within a range of 100 mJ/cm$^2$ to 100 J/cm$^2$. The curing reaction rate in step (4) can be controlled to some extent by changing the integrated irradiation dose. Note that when using a photoactive hydrosilylation catalyst as the curing agent, once activated, the curing reaction proceeds over time at room temperature or by heating to form a cured product, even after irradiation with a high energy beam is stopped. Therefore, shadow curing can also be achieved.

Herein, irradiation with a high energy beam may be performed simultaneous with step (2), for example, before the dispensed composition is applied to the substrate, or after step (2), for example, irradiating the composition applied on the substrate with a high energy beam, or during a chronological combination thereof. The curable silicone composition according to the present invention can be thermally cured by triggering with irradiation by a high energy beam, and thus the process can be designed to chronologically combine the dispensing step and the step of irradiating with a high energy beam.

Although the composition is heated to approximately 50 to 150° C. in step (2), irradiating the composition with a high energy beam while simultaneously dispensing or immediately after applying to the substrate allows thermal curing to occur before the composition cools down, thus allowing thermal curing to proceed to some extent before natural cooling on the substrate. Thereby the curing time in the next step (4) can be reduced.

On the other hand, when the high energy beam is irradiated onto the composition during or immediately after dispensing, the composition begins to thicken from the moment the composition is applied to the substrate, making the composition suitable for applications where the processing time after application is short or unnecessary. For example, the process is suitable for sealing voids between different or the same type of substrate or for encapsulating substrates or the like.

In the case of a step in which the composition applied on the substrate is irradiated with a high energy beam after some time has passed, the curing reaction of the composition will not start until the composition is irradiated with the high energy beam; therefore, application is possible in processes that require sufficient processing time to closely attach to other substrates (second electronic component or substrate that is a precursor) or the like as described later. Furthermore, when interposing the composition between first and second substrates, if both of the two substrates are made of light impermeable materials and the substrates block energy beams such that the composition cannot be irradiated, it is possible to cure even within the so-called shadow area by directly irradiating the curable silicone composition with a high energy beam before closely attaching the second substrate and the composition (=pre-irradiation). In this case, a photoactive hydrosilylation catalyst is preferably used as the curing agent. If this curing agent is used, the curing reaction, once activated, proceeds over time at room temperature or by heating to form a cured product even after irradiation with a high energy beam is stopped. In addition, the curable silicone composition containing a photoactive hydrosilylation catalyst does not require air or moisture for curing after high energy beam irradiation, thus allowing the composition to cure even if the space is enclosed by covering with a second substrate. Furthermore, on the other hand, if one of the two substrates is a light transmitting substrate such as glass, the two substrates can be laminated together before irradiating the curable silicone composition with the high energy beam through the substrate. Needless to say, the curable silicone composition can be irradiated with a high energy beam through gaps between the substrates.

[Step (4)]

Step (4) is a step of curing the composition after irradiation with a high energy beam in step 3. The curing step may be performed in a low temperature region (15 to 100° C.) including room temperature (25° C.). Note that in an embodiment of the present invention, "low temperature" refers, for example, to 100° C. or lower, specifically, a temperature range of 15° C. to 100° C., and even temperatures of 80° C. or lower can be selected. When the reaction of the composition (including a semi-cured product) of the present invention proceeds in the temperature range of 15 to 100° C., the present composition may suitably be left at or near room temperature range (a temperature range that can be reached without heating or cooling, particularly including a temperature region of 20 to 25° C.), may be cooled to 15° C. to room temperature, or may be heated to room temperature or higher and 100° C. or lower. Note that the time required for the curing reaction can be designed as appropriate based on the irradiation dose of a high energy beam such as ultraviolet light or the like and the temperature. Furthermore, heating above 100° C. may be temporarily performed if tolerable and necessary for the process.

The curing rate of the composition can be precisely controlled by the amount of curing agent and curing retarder added, as well as by the irradiation dose of the high energy beam. This can be suitably used when the composition is to be cured in an as-dispensed form, and is specifically applicable to sealing and encapsulating substrates. Curing progresses to some extent immediately after the composition is dispensed and close attachment to the substrate occurs, and therefore, so-called immediate curing and shape fixing of the material can be achieved.

[Step (5)]

If the laminate body according to the present invention is a laminate body with a curable silicone composition or cured product thereof between two or more substrates, a step of closely attaching another substrate to the curable silicone composition dispensed from the dispenser or applied by the coating method described above is preferably added after step (2) and before step (4).

The composition of the present invention has shape retention at 25° C.; therefore, the dispensed material does not change shape due to dripping or the like. Furthermore, the shape of the composition can also be changed to form an adhesive layer that joins two substrates together by closely attaching (preferably by pressing, for example, by applying an external force) a second substrate to the substrate on which the dispensed composition is placed.

The substrate used with the laminate body is a member for electronic components, semiconductor devices or optical semiconductor devices, and the substrate with cured product containing the curable silicone composition according to the present invention (including laminate bodies having a structure in which at least two of the above substrate surfaces are bonded via the cured products) is an electronic component, semiconductor device, or optical semiconductor device, or is useful as a member thereof.

[Curable Silicone Composition]

The curable silicone composition according to the present invention is a solid having shape retention at 25° C. However, as mentioned above, the composition has hot-melt properties, and in particular, the melt viscosity (measured with a flow tester: nozzle diameter 1 mm, pressure 2.5 MPa) at 100° C. must be 50 Pa·s or less. Note that shape retention means that the material does not substantially deform or flow in the absence of an external force, and may be a solid or raw rubber-like solid that can be deformed or plasticized by applying an external force.

The curable silicone composition according to the present invention has a property of rapidly melting and decreasing viscosity in conjunction with increasing temperature under high temperature and high pressure conditions in the manufacturing process of the laminate body or the like, and the melt viscosity is preferably measured under high pressure using a flow tester such as a Koka-type flow tester (manufactured by Shimadzu Corporation). Specifically, the present composition preferably has a melt viscosity at 100° C. of 50 Pa·s or less, and more preferably 30 Pa·s or less, as measured using a Koka-type flow tester with an outlet nozzle diameter of 1 mm, an intake nozzle diameter of 10 mm, a nozzle length of 20 to 30 mm, and a pressure of 2.5 MPa. This is because a melt viscosity within the above mentioned range provides favorable dispensability at 100° C.

The curable silicone composition according to the present invention has a property where curing is triggered by irradiation with the aforementioned high energy beam. The curing reaction system for achieving these curing properties is not particularly limited, and includes (1) hydrosilylation reaction curing systems using a photoactive hydrosilylation reaction catalyst, and (II) photo-radical polymerization reaction systems containing siloxane compounds containing aliphatic carbon-carbon double bonds, an isocyanurate compound as a crosslinking agent, and a photo-radical polymerization initiator (which may optionally contain photosensitizers), and combinations thereof, and may optionally contain curing agents, crosslinking agent components, and the like used for other curing reaction systems. However, the curable silicone composition cured by high energy beam irradiation is preferably a silicone composition cured by a hydrosilylation reaction curing system that uses a photoactive hydrosilylation reaction catalyst, because this makes it possible to realize a form filled in a dispensing cartridge, pail, or drum, while providing excellent storage stability and reaction controllability.

The curable silicone composition according to the present invention particularly preferably contains:

(A) 100 parts by mass of organopolysiloxane resin containing the following components (A1) and (A2) at a mass ratio of 20:80 to 90:10, where each individual component does not have hot-melt properties and is solid at 25° C.

(A1) an organopolysiloxane resin having a curing reactive functional group with a carbon-carbon double bond included in a molecule, and containing a siloxane unit expressed by $RSiO_{3/2}$ (R represents a monovalent organic group, hydroxyl group or alkoxy group) or $SiO_{4/2}$ making up at least 20 mol % or more of all siloxane units, and (A2) an organopolysiloxane resin having a curing reactive functional group with a carbon-carbon double bond included in a molecule, and containing a siloxane unit expressed by $SiO_{4/2}$ making up at least 20 mol % or more of the total siloxane units;

(B) a linear organopolysiloxane in a liquid state at 25° C., having a curing reactive functional group containing at least two carbon-carbon double bonds in a molecule;

(C) an organohydrogen polysiloxane that includes, within a molecule, at least two silicon atom-bonded hydrogen atoms; and (D) a hydrosilylation reaction catalyst that does not exhibit activity without irradiating with a high energy beam, but exhibits activity in a composition by irradiating a high energy beam.

The composition may also contain (E) a hydrosilylation reaction curing retarder with a boiling point of 200° C. or higher under atmospheric pressure, and which may contain other additives, so long as the technical effects of the present invention are not impaired.

[Organopolysiloxane Resin (A1) Having Curing Reactive Functional Group]

Component (A1) is one of the main agents of the present composition, and has a curing reactive functional group containing a carbon-carbon double bond in a molecule, in which at least 20 mol % or more of all siloxane units are siloxane units expressed by $SiO_{4/2}$, and the component (A1) alone does not have hot-melt properties, and is a solid organopolysiloxane resin in a solvent-free state at 25° C. Herein, R represents a monovalent organic group, a hydroxyl group or an alkoxy group, and is preferably selected from curing reactive groups with a carbon-carbon double bond described later, monovalent hydrocarbon groups with 1 to 10 carbon atoms without a carbon-carbon double bond, hydroxyl groups, or alkoxy groups with 1 to 10 carbon atoms.

The curing reactive group having a carbon-carbon double bond may be a functional group having a carbon-carbon double bond such as a (meth)acryloxy group or the like, but is particularly preferably a hydrosilylation reactive functional group. Such a functional group can form a cured product in the presence of (C) an organohydrogen polysiloxane and (D) a photoactive hydrosilylation reaction catalyst described later. Examples of such a curing reactive group include alkenyl groups with 2 to 10 carbons, and is particularly preferably a vinyl group or 1-hexenyl group.

Preferably, the percentage of alkenyl groups in component (A1) is within a range of 1 to 12 mol %, and preferably 2 to 10 mol %, of all silicon atom-bonded organic groups. If the alkenyl group content is less than the lower limit of the range described above, the mechanical strength (hardness and the like) of the resulting cured product may be insufficient. On the other hand, if the amount of alkenyl groups is at or below the upper limit of the range described above, the composition containing the component can achieve favorable hot-melt performance as an entire composition.

Component (A1) may contain another functional group that does not have a carbon-carbon double bond, and in particular, preferably contains a functional group selected from monovalent hydrocarbon groups with 1 to 10 carbon atoms that do not have a carbon-carbon double bond, and particularly preferably an alkyl group with 1 to 10 carbon atoms such as a methyl group or the like. On the other hand, component (A1) has a percentage of phenyl groups and the like of all silicon-bonded organic groups within a range of 0 to 5 mol %, more preferably within a range of 0 to 2 mol %, but most preferably does not contain aryl groups at all (=0 mol %). If a large amount of phenyl groups or other aryl groups are included, component (A1) itself may have hot-melt properties, the technical effect of the present invention may not be achieved, and in the cured product, an effect of reinforcing the cured product inherent to $SiO_{4/2}$ groups may be reduced.

Preferably, the functional group bonded to the silicon atom in component (A1) is a group selected from methyl groups, vinyl groups and other alkenyl groups. 70 to 99 mol % of all silicon-bonded organic groups are preferably methyl groups, 80 to 98 mol % are more preferably methyl groups, and 88 to 98 mol % are particularly preferably methyl groups, with any other organic groups bonded to a silicon atom being a vinyl group or other alkenyl group. In such a range, component (A1) is not hot-meltable alone, but is useful as a component that is particularly excellent in coloring resistance and the like at high temperatures of a cured product obtained from the curable silicone composition of the present invention. Note that a small amount of hydroxyl groups or alkoxy groups may be included in component (A1).

Component (A1) contains a siloxane unit expressed by $SiO_{4/2}$, which are branched units, making up at least 20 mol % of all siloxane units, preferably at least 40 mol % or more of all siloxane units, more preferably 50 mol % or more, and particularly preferably are within a range of 50 to 90 mol %. Note that R preferably represents a monovalent organic group, and particularly preferably a methyl group from the perspective of compatibility with other components. If the amount of the siloxane units expressed by $SiO_{4/2}$ is less than the aforementioned lower limit, a technical effect of the present invention may not be achieved even if the organopolysiloxane resin contains a large amount of another branched siloxane unit (for example, $RSiO_{3/2}$), for example.

Component (A1) may suitably be:

(A1-1) an organopolysiloxane resin expressed by the following average unit formula:

$$(R^1_3SiO_{1/2})_a(R^1_2SiO_{2/2})_b(R^1SiO_{3/2})_c(SiO_{4/2})_d(R^2O_{1/2})_e$$

(where each $R^1$ independently represents a monovalent hydrocarbon group with 1 to 10 carbon atoms, but 1 to 12 mol % of all $R^1$ in one molecule represents an alkenyl group; each $R^2$ represents a hydrogen atom or an alkyl group with 1 to 10 carbon atoms; and a, b, c, d, and e represent numbers that satisfy $0.10 \le a \le 0.60$, $0 \le b \le 0.70$, $0 \le c \le 0.80$, $0.2 \le d \le 0.65$, $0 \le e \le 0.05$, but $c+d>0.20$ and $a+b+c+d=1$).

In the aforementioned average unit formula, each $R^1$ independently represents a monovalent hydrocarbon group having 1 to 10 carbon atoms, such as groups selected from a group consisting of: methyl groups and other alkyl groups with 1 to 10 carbons, particularly preferably methyl groups; vinyl groups and other alkenyl groups with 2 to 10 carbons; phenyl groups and other aryl groups; and benzyl groups and other aralkyl groups. Furthermore, 2 to 45 mol % of all $R^1$s in one molecule are alkenyl groups, and 2 to 35 mol % of all $R^1$s in one molecule are preferably alkenyl groups, and particularly preferably vinyl groups and/or 1-hexenyl groups. If the alkenyl group content is less than the lower limit of the range described above, the mechanical strength (hardness and the like) of the resulting cured product may be insufficient. On the other hand, if the amount of alkenyl groups is at or below the upper limit of the range above, a composition containing the present component can form a cured product with excellent mechanical strength. Note that each $R^1$ preferably represents a functional group selected from the alkyl groups and alkenyl groups above, but from the perspective of the technical effect of the present invention, the $R^1$ preferably does not substantially contain a phenyl group or other aryl group.

In the formula above, $R^2$ represents a hydrogen atom or an alkyl group having or 1 to 10 carbon atoms. The group $R^2O_{1/2}$ containing the $R^2$ corresponds to a hydroxyl group or alkoxy group of the organopolysiloxane resin of component (A1).

In the formula above, "a" represents a number indicating the percentage of siloxane units in the general formula: $R^1_3SiO_{1/2}$. "a" satisfies $0.1 \le a \le 0.90$, and preferably satisfies $0.15 \le a \le 0.85$. If "a" is within the above range, the curable silicone composition containing this component can be provided with favorable hot-melt properties, and a cured product thereof will have excellent adhesive properties and mechanical strength (hardness, elongation, and the like).

In the formula above, "b" represents a number indicating the percentage of siloxane units in the general formula: $R_{12}SiO_{2/2}$. "b" is a value that satisfies $0 \le b \le 0.70$, and preferably satisfies $0 \le b \le 0.60$. If "b" is at or below the upper limit of the aforementioned range, the curable silicone composition containing this component will have favorable hot-melt properties and the composition will be less sticky at room temperature. In the present invention, "b" may be 0 and is preferably 0.

In the formula above, "c" represents a number indicating the percentage of siloxane units in the general formula: $R^3SiO_{3/2}$. "c" is a value that satisfies $0 \le c \le 0.80$, and preferably satisfies $0 \le c \le 0.75$. If "c" is at or below the upper limit of the aforementioned range, the curable silicone composition containing this component will have favorable hot-melt properties and the composition will be less sticky and the surface will have low tack at room temperature. In the present invention, "c" may be 0 and is preferably 0.

In the formula above, "d" represents a number indicating the percentage of siloxane units with the formula $SiO_{4/2}$, and must satisfy the equation $0.20 \le d \le 0.65$, preferably satisfies 0.25 s d≤0.65, and particularly preferably satisfies 0.40 s d≤0.65. If "d" is within the aforementioned numerical value range, the composition containing this component can achieve favorable hot-melt performance as a whole composition, and a cured product obtained by curing the composition can be relatively hard and have sufficient flexibility for practical use.

In the present invention, the equation $c+d>0.20$ must be satisfied. If the value of c+d is 0.20 or less, favorable hot-melt performance cannot be achieved for the composition as a whole, and a technical effect of the present invention may not be sufficiently achieved.

In the formula above, "e" is a number indicating the percentage of units in the general formula: $R^2O_{1/2}$, where the units are a hydroxyl group or alkoxy group bonded to a silicon atom that can be included in the organopolysiloxane resin. "e" satisfies the equation $0 \le e \le 0.05$, and preferably satisfies $0 \le e \le 0.03$. Note that in the formula above, the sum of "a", "b", "c", and "d", which is the sum of each siloxane unit, is equal to 1.

Component (A1) is a solid at room temperature, and therefore, in order to physically blend with the component (B) described later, component (A1) is preferably used in a state of being dissolved in a solvent or solvent mixture selected from a group consisting of: toluene, xylene, mesitylene, and other aromatic hydrocarbons; tetrahydrofuran, dipropyl ether, and other ethers; hexamethyldisiloxane, octamethyltrisiloxane, decamethyltetrasiloxane, and other silicones; ethyl acetate, butyl acetate, propylene glycol monomethyl ether, and other esters; acetone, methyl ethyl ketone, methyl isobutyl ketone, and other ketones; and the like. The solvent used herein can be efficiently removed in a process described later.

[Organopolysiloxane Resin (A2) without Curing Reactive Functional Group]

Component (A2) is one of the main agents of the present composition, does not have a curing reactive functional group containing a carbon-carbon double bond, has at least 20 mol % or more of all siloxane units as siloxane units expressed by $SiO_{4/2}$, and component (A2) alone does not have hot-melt properties, and is a solid organopolysiloxane resin in a solvent-free state at 25° C. By using component (A2) in combination with component (A1) and component (B) within a predetermined quantitative range, it is possible to achieve hot-melt properties for the curable silicone composition as a whole, and this component can provide excellent stress relaxation properties to the cured product obtained by curing the curable silicone composition.

Component (A2) does not contain a curing reactive functional group containing a carbon-carbon double bond such as an alkenyl group or the like in a molecule, while preferably containing a monovalent hydrocarbon group with 1 to 10 carbon atoms without a carbon-carbon double bond, and particularly preferably a functional group selected from methyl groups and other alkyl groups with 1 to 10 carbon atoms, and aryl groups. On the other hand, component (A2) preferably has a percentage of phenyl groups and other aryl groups in all silicon-bonded organic groups within a range of 0 to 5 mol %, more preferably within a range of 0 to 2 mol %, and most preferably does not contain aryl groups at all (=0 mol %). If the amount of aryl groups in component (A2) exceeds the aforementioned upper limit (if a large amount of phenyl groups or other aryl groups are included), component (A2) itself may have hot-melt properties, the technical effect of the present invention may not be achieved, and in the cured product, an effect of reinforcing the cured product inherent to $SiO_{4/2}$ groups may be reduced, and deterioration of coloring resistance of the cured product may occur under high temperatures.

Preferably, 70 to 100 mol % of the silicon atom-bonded organic groups in component (A2) are preferably methyl groups, 80 to 100 mol % are more preferably methyl groups, and 88 to 100 mol % are particularly preferably methyl groups. Within this range, component (A2) can be a component that does not exhibit hot-melt properties alone, and that particularly has an excellent reinforcing effect of a cured product containing siloxane units expressed by $SiO_{4/2}$. Note that the organopolysiloxane resin of component (A2) may contain a small amount of hydroxyl groups or alkoxy groups.

Component (A2) is an organopolysiloxane resin that is solid at 25° C. in a solvent-free state, and contains a siloxane unit expressed by $SiO_{4/2}$ making up at least 20 mol % or more of all siloxane units, which is a branched siloxane unit, in a molecule. Preferably, the $SiO_{4/2}$ unit of the organopolysiloxane of component (A2) is at least 40 mol %, more preferably 50 mol % or more, and particularly preferably within a range of 50 to 65 mol % of all siloxane units.

Preferably, component (A2) is (A2-1) an organopolysiloxane resin expressed by the following average unit formula:

$$(R^3_3SiO_{1/2})_f(R^3_2SiO_{2/2})_g(R^3SiO_{3/2})_h(SiO_{4/2})_i(R^2O_{1/2})_j$$

(where each $R^3$ independently represents a monovalent hydrocarbon group having 1 to carbon atoms and not containing a carbon-carbon double bond; $R^2$ is a hydrogen atom or an alkyl group having 1 to 10 carbon atoms; and f, g, h, i, and j are numbers satisfying the following: $0.35 \le f \le 0.55$, $0 \le g \le 0.20$, $0 \le h \le 0.20$, $0.45 \le i \le 0.65$, $0 \le j \le 0.05$, and $f+g+h+i=1$)

In the average unit formula above, $R^2$ represents the same group as above, and is preferably a hydrogen atom or a methyl group. $R^3$ independently represents a monovalent hydrocarbon group having 1 to 10 carbon atoms and containing no carbon-carbon double bond, such as a methyl or other alkyl group. Herein, it is particularly preferred from the perspective of industrial production and the technical effect of the invention that 70 mol % or more, and more preferably 88 mol % or more of the total $R^3$ in one molecule is a methyl group or other alkyl group with 1 to 10 carbon atoms, and particularly a methyl group. On the other hand, $R^3$ is preferably substantially free of phenyl groups and other aryl groups.

In the formula above, "f" represents a number indicating the percentage of siloxane units in the general formula: $R^3_3SiO_{1/2}$. $0.35 \le f \le 0.55$, preferably $0.40 \le f \le 0.50$ is satisfied.

If "f" is within the range above, the curable silicone composition containing this component can be provided with favorable hot-melt properties, and a cured product thereof will have excellent adhesive properties and mechanical strength (hardness and the like).

In the formula above, "g" represents a number indicating the percentage of siloxane units in the general formula: $R^1_2SiO_{2/2}$. "g" is a value that satisfies $0 \le g \le 0.20$, and preferably satisfies $0 \le g \le 0.10$. If "g" is at or below the upper limit of the range, the curable silicone composition containing this component will have favorable hot-melt properties and the composition will be less sticky at room temperature. In the present invention, "g" may be 0 and is preferably 0.

In the formula above, "h" represents a number indicating the percentage of siloxane units in the general formula: $R_1SiO_{3/2}$. "h" is a value that satisfies 0≤h≤0.20, and preferably satisfies 0≤h≤0.10. If "h" is at or below the upper limit of the range, the curable silicone composition containing this component will have favorable hot-melt properties and the composition will be less sticky and the surface will have low tack at room temperature. In the present invention, "h" may be 0 and is preferably 0.

In the formula above, "i" represents a number indicating the percentage of $SiO_{4/2}$ siloxane units, and preferably satisfies 0.30≤i≤0.65, and particularly preferably satisfies 0.50≤i≤0.65. When "i" is within the numerical value range, the curable silicone composition containing this component can achieve favorable hot-melt performance as a whole composition, and thus a composition can be achieved, which has excellent mechanical strength of a cured product obtained by curing the curable silicone composition, has no stickiness as a whole composition, and has favorable handling workability.

In the formula above, "i" is a number indicating the percentage of units of the general formula: $R^2O_{1/2}$, where the units are a hydroxyl group or alkoxy group bonded to a silicon atom that can be included in the organopolysiloxane resin. "j" is a value that satisfies 0 s j s 0.05, and preferably satisfies 0 s j s 0.03. Note that in the formula above, the sum of "f", "g", "h", and "i", which is the sum of each siloxane unit, is equal to 1.

Component (A2) is solid at room temperature and is preferably used in a form dissolved in a solvent or solvent mixture for physical mixing with component (B) described later. Herein, the type of solvent is the same as that of component (A1).

[Component (A)]

The curable silicone composition according to the present invention contains as component (A) the aforementioned components (A1) and (A2) at a mass ratio of 20:80 to 90:10, preferably 35:65 to 90:10, more preferably 50:50 to 90:10. Herein, although each component of component (A) does not itself have hot-melt properties, but hot-melt properties of the whole composition can be achieved by concomitantly using component (B) described later in a predetermined mass ratio range. By using component (A1) in combination with component (A2) in the present composition, it is possible to adjust to a certain degree the storage elastic modulus, loss elastic modulus, and tan δ calculated from the ratio therefrom of a cured product obtained by curing the curable composition, thereby achieving an elastic modulus, flexibility, and stress relaxation properties that are suitable for the cured product.

Component (A) and constituent components (A1) and (A2) preferably have a mass loss ratio of 2.0 mass % or less when exposed to 200° C. for 1 hour. These components are organopolysiloxane resins containing M units ($R^3{}_3SiO_{1/2}$) and Q units ($SiO_{4/2}$), and volatile low molecular weight components, specifically $M_4Q$ structures, are generated as by-products during the polymerization process. However, this structure has significantly reduced strength of a cured product obtained from the curable silicone composition of the present invention, and if a curable silicone composition containing the $M_4Q$ structure is molded together with a substrate of a semiconductor or the like, and then exposed to a high temperature to remove the $M_4Q$ structure, the volume of a cured product resulting from the curable silicone composition may decrease and the hardness of the cured product may significantly increase, resulting in changes in the dimensions of a molded product, warping, and the like. Furthermore, there is a possibility that the tackiness of the surface of the cured product may increase. Furthermore, if a large amount of $M_4Q$ structure remains in the composition or cured product, a marked increase in hardness may also occur in the adhesive layer or sealing layer for double-sided adhesion, and the elastic modulus may change significantly. Therefore, in order to apply the curable silicone compositions of the present invention to applications laminated with a substrate of a semiconductor or the like, the $M_4Q$ structure is preferably removed from the organopolysiloxane resin at the point of a raw material prior to a molding process of curing with the curable silicone composition by laminating with a substrate, and, if possible, prior to preparing the curable silicone composition.

However, the $M_4Q$ structure is highly compatible with organopolysiloxane resins, and it is difficult to remove volatile low molecular weight components, specifically the $M_4Q$ structure, from component (A) and the like under drying conditions that remove organic solvents. Therefore, since volatile components can be removed by treating the resulting crude raw material, organopolysiloxane resin, for a short time at a high temperature of approximately 200° C., volatile components such as organic solvents and $M_4Q$ structures and the like can be simultaneously removed from components (A1) and (A2) using a twin-screw kneader or the like set at a temperature of 200° C. or higher, and thereby, volatile low molecular weight components in component (A) are removed from the raw material before the curable silicone composition is prepared, and thus component (A) preferably has a mass loss ratio of 2.0 mass % or less after 1 hour of exposure at 200° C., but the mass loss ratio is more preferably 1.0 mass % or less.

Note that from the perspective of efficient production of the curable hot-melt silicone composition of the present invention, component (B), described later, is preferably added to component (A) that is dissolved in an organic solvent, and the mixture is fed in a liquid state into a twin-screw extruder set at 200° C. or higher, and a process of removing volatile components such as $M_4Q$ structures and the like is performed. This method enables obtaining a mixture of component (A) and component (B) having hot-melt properties, which can be used for kneading in the remaining components included in the curable silicone composition in a process described later.

[Component (B)]

Component (B) is one of the main agents of the present curable silicone composition, and is a linear organopolysiloxane that is liquid at 25° C. and has a curing reactive functional group containing at least two carbon-carbon double bonds in a molecule. Such a curing reactive chain organopolysiloxane, when concomitantly used with the solid organopolysiloxane resin of component (A) described above, can exhibit hot-melt properties as an entire composition.

Component (B) must have a curing reactive functional group having a carbon-carbon double bond in a molecule. Such a curing reactive functional group is hydrosilylation reactive, and forms a cured product by a crosslinking reaction with another component. Such a curing reactive functional group is preferably an alkenyl group similar to that provided by component (A1), and particularly preferably a vinyl group or hexenyl group.

Component (B) is a raw rubber-like chain organopolysiloxane that is liquid or plastic at 25° C. (room temperature) and, when used in combination with component (A), imparts the composition of the present invention with hot-melt properties. The chemical structure of the organopolysiloxane of component (B) is linear or branched, and may have a branched polysiloxane structure using a few T units or Q units, but preferably is a linear diorganopolysiloxane expressed by the following structural formula (B1):

$$R^4_3SiO(SiR^4_2O)_kSiR^4_3$$

(where each $R^4$ independently represents a monovalent hydrocarbon group having 1 to carbon atoms, except that at least two of the $R^4$ in one molecule are an alkenyl group, and k is a number from 20 to 1,000).

A linear diorganopolysiloxane having an alkenyl group, and particularly preferably a vinyl group at each end of the molecular chain is preferred.

In the formula above, each $R^4$ independently represents a monovalent hydrocarbon group having 1 to 10 carbon atoms, such as groups selected from a group consisting of: methyl and other alkyl groups, and particularly preferably methyl groups; vinyl and other alkenyl groups, and particularly preferably vinyl groups and/or hexenyl groups; phenyl and other aryl groups; and benzyl and other aralkyl groups. Furthermore, at least two of the $R^4$ in one molecule are alkenyl groups, and preferably a vinyl group. Furthermore, each $R^4$ is preferably a functional group selected from a group consisting of methyl groups and other alkyl groups with 1 to 10 carbon atoms and vinyl groups, hexenyl groups and other alkenyl groups, and it is preferable that of all $R^4$s, at least two are alkenyl groups per molecule, and the remaining $R^4$ are methyl groups. Note that from the perspective of a technical effect of the invention, $R^4$ is preferably substantially free of phenyl groups and other aryl groups. If a large amount of phenyl groups or other aryl groups are included, the coloring resistance at high temperatures of the cured product obtained from the curable silicone composition may deteriorate. Particularly preferably, a vinyl group or other alkenyl group is preferred at each end of a molecular chain, with the rest of $R^4$ being a methyl group.

In the formula above, "k" represents a number between 20 and 5,000, preferably between 30 and 3,000, and particularly preferably between 45 and 800. If "k" is at or above the lower limit of the aforementioned range, a curable silicone composition having little stickiness at room temperature can be obtained. On the other hand, if "k" is at or below the upper limit of the aforementioned range, the curable silicone composition as a whole can achieve a favorable hot-melt performance.

The added amount of component (B) is within a range of 10 to 100 parts by mass, preferably within a range of 50 to 100 parts by mass, and more preferably within a range of 70 to 100 parts by mass, with regard to 100 parts by mass of component (A). If the amount of component (B) is within the aforementioned range, the resulting curable silicone composition will exhibit hot-melt properties suitable for hot dispensing processes, have excellent handling workability due to reduced stickiness at room temperature, and improved mechanical strength of the cured product obtained by curing the composition.

[Component (C)]

Component (C) is an organohydrogen polysiloxane having at least two silicon atom-bonded hydrogen atoms in a molecule, and is a crosslinking agent that cures the composition by addition reaction (hydrosilylation reaction) with the carbon-carbon double bond in components (A1) and (B) in the presence of component (D).

The structure of the crosslinking agent, organohydrogen polysiloxane, is not particularly limited and may be linear, branched-chain, cyclic, or resinous. In other words, component (C) may be an organohydrogenpolysiloxane having, as a main constituent unit, a hydrogen organosiloxy unit expressed by $HR_2SiO_{1/2}$ (DH unit, wherein R is independently a monovalent organic group), and at an end thereof a hydrogen diorganosiloxy unit expressed by $HR_2SiO_{1/2}$ (MH unit, wherein R is independently a monovalent organic group), and component (C) may be a chain organohydrogen polysiloxane containing the DH units and the like.

On the other hand, when the curable silicone composition is used in a molding process, since the amount of the curing reactive functional group containing a carbon-carbon double bond in the present composition is small, from the perspective of curing rate, moldability, and curing curability thereof, the organohydrogen polysiloxane is preferably an organohydrogen polysiloxane resin containing a monoorganosiloxy unit expressed by $RSIO_{3/2}$ (T unit, where R represents a monovalent organic group or a silicon atom-bonded hydrogen atom) or a branched unit of a siloxy unit (Q unit) expressed by $SiO_{4/2}$, having at least two hydrogen diorganosiloxy units expressed by $HR_2SiO_{1/2}$ ($M^H$ unit, where R independently represents a monovalent organic group) in a molecule, and having the $M^H$ unit at a molecular terminal.

Component (C) according to the present invention is preferably an organohydrogen polysiloxane with low volatility, and more specifically, it may be characterized by having minimal volatile low molecular weight contents, with a mass loss ratio of 10 mass % or less after exposure to 100° C. for 1 hour under atmospheric pressure, as compared to before exposure. As described later, each component of the curable silicone composition, as well as the composition obtained thereby is preferably melted and kneaded within a temperature range of 50 to 150° C. under reduced pressure during the production process of filling cartridges with the curable silicone composition of the present invention, in order to obtain a composition that is free of voids, or the like. However, if a large amount of the components that compose the composition volatilize under these kneading conditions, it may not be possible to obtain a composition with the designed properties, even after heating for a very short period of time. In particular, the amount of organohydrogen polysiloxane, which is a crosslinking agent, added to the total mass of the curable silicone composition is small, so the properties of the composition (curing properties, physical properties of the cured product, and the like) can vary greatly from the intended values due to volatilization of the component, and therefore with regard to component (C), it is particularly preferable to select an organohydrogen polysiloxane with low volatility, based on the use and manufacturing method (in particular, filled in a cartridge).

A particularly suitable organohydrogen polysiloxane is an organohydrogen polysiloxane resin expressed by the following average unit formula (1):

$$(R^5_3SiO_{1/2})I(R^6_2SiO_{2/2})_m(R^6SiO_{3/2})_n(SiO_{4/2})_p(R^2O_{1/2})_q$$

In the formula, each $R^5$ is the same or different hydrogen atom or monovalent hydrocarbon group with 1 to 10 carbon atoms without an aliphatic unsaturated carbon bond, where at least two $R^5$ in one molecule are hydrogen atoms. A monovalent hydrocarbon group corresponding to $R^5$ except for hydrogen atoms includes, for example: methyl and other alkyl groups; phenyl and other aryl groups; benzyl and other aralkyl groups; other halogenated alkyl groups; and the like. From an industrial viewpoint, methyl groups or phenyl groups are preferred.

In the formula, $R^6$ represents a monovalent hydrocarbon group with 1 to 10 carbon atoms without an aliphatic unsaturated carbon bond, and examples include the same groups as the monovalent hydrocarbon group described above. On the other hand, $R^2$ is a hydrogen atom or an alkyl group having 1 to 10 carbon atoms, and examples include the same groups as those suggested for $R^2$ in the above component (A1) or component (A2).

In the formula, l, m, n and p are numbers that satisfy $0.01 \leq l \leq 0.6$, $0 \leq m$, $0 \leq n \leq 0.9$, $0 \leq p \leq 0.9$, and $l+m+n+p=1$, and preferably $0 \leq q \leq 0.05$ and $n+p \geq 0.2$. Specific examples of the organohydrogen polysiloxane resin, which is component (C), include $M^H$MT resins, $M^H$T resins, $M^H$MTQ resins, $M^H$MQ resins, $M^H$DQ resin, $M^H$Q resins, and the like. In the notation of the resin above, M, D, T, and Q represent a M unit, D unit, T unit, and Q unit, respectively, and $M^H$ represents an M unit with a hydrogen atom.

Component (C) is preferably an organohydrogen polysiloxane containing Q units expressed by the following average unit formula (2).

$$(HR^6_2SiO_{1/2})_e(R^6_2SiO_{2/2})_f(SiO_{4/2})_g \quad \text{Average unit formula (2):}$$

In the formula, $R^6$ independently represents an unsubstituted or substituted monovalent hydrocarbon group that does not contain an aliphatic unsaturated bond with 1 to 12 carbon atoms, and "e", "f", and "g" represent numbers that satisfy conditions of $0.01 \leq e \leq 0.6$, $0 \leq f \leq 0.9$, $0.2 \leq g \leq 0.9$, and $e+f+g=1$.

Specific examples of the monovalent hydrocarbon group include the same as those indicated as specific examples of the monovalent hydrocarbon group expressed by $R^4$ in average compositional formula (1) above. $R^6$ preferably independently represents a group selected from methyl groups and phenyl groups.

Similarly, component (C) is preferably an organohydrogen polysiloxane containing T units expressed by the following average unit formula (3).

$$(HR^7_2SiO_{1/2})_h(R^7_2SiO_{2/2})_i(R^8SiO_{3/2})_j \quad \text{Average unit formula (3):}$$

In the formula, $R^7$ and $R^8$ each independently represent an unsubstituted or substituted monovalent hydrocarbon group that does not contain an aliphatic unsaturated bond with 1 to 12 carbon atoms, at least 10 mol % of all $R^8$s represent aryl groups, and h, i, and j represents numbers that satisfy conditions of $0.01 \leq h \leq 0.6$, $0 \leq i \leq 0.9$, $0.2 \leq j \leq 0.9$, and $h+i+j=1$.

Specific examples of the monovalent hydrocarbon group include the same groups as those indicated as specific examples of the monovalent hydrocarbon group in average unit formula (1). $R^8$ preferably independently represents a group selected from methyl groups and phenyl groups, provided that at least 10 mol % of all $R^8$s are a phenyl group.

The organohydrogen polysiloxane resins expressed by the average unit formulas (2) or (3) may be used alone or in combination.

The amount of the organohydrogen polysiloxane of component (C) in the curable silicone composition of the present invention is an amount sufficient to cure the curable silicone composition. For the curing reactive functional groups (such as vinyl groups or other alkenyl groups) containing a carbon-carbon double bond in component (A) and component (B), the amount of hydrogen atoms bonded to silicon atoms in the organohydrogen polysiloxane of component (C) is an amount where the number of silicon atom-bonded hydrogen atoms per one alkenyl group for alkenyl groups bonded to silicon atoms included in the entire curable silicone composition is 0.5 to 20.0, and particularly preferably within a range of 1.0 to 10.

[Component (D)]

Component (D) is one characteristic component of the curable silicone composition according to the present invention, is a hydrosilylation reaction catalyst for curing the curable silicone composition of the present invention by crosslinking the curing reactive functional groups containing a carbon-carbon double bond included in components (A)/(B) and the silicon atom-bonded hydrogen atoms, the Si—H groups, included in component (C) through a hydrosilylation reaction, and is specifically a hydrosilylation reaction catalyst that does not exhibit activity unless irradiated with a high energy beam, but exhibits activity in the composition upon irradiation with a high energy beam.

Component (D) is a so-called high energy beam activated catalyst or photoactivated catalyst, which is known in the present technical field. The photoactive hydrosilylation reaction catalyst that is component (D) is not activated even in a heated and molten state, unless irradiated with a high energy beam such as ultraviolet light or the like, while the curing reaction proceeds smoothly at low temperatures such as room temperature or the like, without heating, after irradiation with a high energy beam. Therefore, although the composition according to the present invention as a whole can be immediately cured at low temperature when triggered by irradiation of a high energy beam, the composition has excellent storage stability, and can be suitably applied to hot dispensing processes that require exposure of the composition at temperatures of 50° C. or higher, and the reaction is easily controlled, and therefore, properties such as excellent handling workability can be achieved. Furthermore, the catalytic activity of the component (D) is suppressed during the heating and melting process for a short period of time; therefore, the curable silicone composition can be melted and kneaded within a temperature range of 50 to 150° C. under reduced pressure without losing storage stability in the production process of filling cartridges, pails, or drums with the curable silicone composition of the present invention, and it is possible to fill dispenser cartridges, pails, or drums.

Specific examples of component (D) include (methylcyclopentadienyl) trimethyl platinum (IV), (cyclopentadienyl) trimethyl platinum (IV), (1,2,3,4,5-pentamethyl cyclopentadienyl) trimethyl platinum (IV), (cyclopentadienyl) dimethylethyl platinum (IV), (cyclopentadienyl) dimethylacetyl platinum (IV), (trimethylsilyl cyclopentadienyl) trimethyl platinum (IV), (methoxycarbonyl cyclopentadienyl) trimethyl platinum (IV), (dimethylsilyl cyclopentadienyl) trimethylcyclopentadienyl platinum (IV), trimethyl (acetylacetonato) platinum (IV), trimethyl (3,5-heptanedionate) platinum (IV), trimethyl(methylacetoacetate) platinum (IV), bis(2,4-pentanedionato) platinum (II), bis(2,4-hexanedionato) platinum (II), bis(2,4-heptanedionato) platinum (II), bis(3,5-heptanedionato) platinum (II), bis(1-phenyl-1,3-butanedionato) platinum (II), bis(1,3-diphenyl-1,3-propanedionato) platinum (II), and bis(hexafluoroacetylacetonato) platinum (II). Of these, (methylcyclopentadienyl) trimethyl platinum (IV) and bis(2,4-pentanedionato) platinum (II) are preferred from the perspective of versatility and ease of acquisition.

The added amount of component (D) is a catalytic amount. Specifically, the amount is preferably such that the amount of metal atoms in component (D) is preferably in a range of 1 to 500 ppm, and more preferably in a range of 2 to 200 ppm, in mass units, with respect to the whole composition.

The composition according to the present invention may optionally contain other curing agents (for example, peroxides, photoinitiators, photosensitizers, and the like), and a hydrosilylation reaction catalyst other than a photoactive type may be included within a range in which the technical effects of the present invention are not impaired. Note that a fine particulate platinum-containing hydrosilylation reaction catalyst dispersed or encapsulated with a thermoplastic resin may be included in the hydrosilylation reaction catalyst other than the photoactive catalyst. However, for the above reasons, including prevention of voids and the like, these optional curable components are preferably substantially non-volatile.

[Hydrosilylation Reaction Curing Retarder]

In addition to components (A) to (D) above, the curable silicone composition of the present invention may further contain a hydrosilylation reaction curing retarder. The structure of the curing retarder is not particularly limited, but from the perspective of the technical effect of the present invention, use of (E) a hydrosilylation reaction curing retarder with a boiling point of 200° C. or higher under atmospheric pressure is particularly preferred. If a compound with a low boiling point is used as a curing retarder when melting and kneading raw materials under reduced pressure during a production process of the curable silicone composition sheet described below, a portion or all of the curing retarder may volatilize during the melting and kneading process, and thus a targeted effect of the curing retarding effect may not be achieved with the curable silicone composition.

The curing retarder of the present invention is not particularly limited, and examples include: 2-methyl-3-butyne-2-ol, 3,5-dimethyl-1-hexyne-3-ol, 2-phenyl-3-butyne-2-ol, 1-ethynyl-1-cyclohexanol, and other alkyne alcohols; 3-methyl-3-pentene-1-yne, 3,5-dimethyl-3-hexene-1-yne, and other enyne compounds; tetramethyltetravinylcyclotetrasiloxane, tetramethyltetrahexenylcyclotetrasiloxane, and other alkenyl group-containing low molecular weight siloxanes; and methyl tris(1,1-dimethyl propynyloxy)silane, vinyl tris(1,1-dimethyl propynyloxy)silane, and other alkynyloxysilanes. Of these, the use of (E) a curing retarder with a boiling point of 200° C. or higher under atmospheric pressure is particularly preferred, and for practical use, the use of alkynyloxysilanes such as methyl-tris(1,1-dimethylpropynyloxy)silane and vinyl-tris(1,1 dimethylpropynyloxy)silane, and the like is preferred. The amount of the curing retarder in the curable silicone composition is not particularly limited, but is preferably within a range of 1 to 10,000 ppm in mass units, with regard to the composition.

[(F) Other Additives]

In addition to the above components (A) to (D) and optional component (E), materials known in the art as additives that may be used in a silicone composition may be added to the curable silicone composition of the present invention. Herein, the additives that can be used include, but are not limited to, the following. Note that when melting and kneading raw materials under reduced pressure in the production process of the curable silicone composition and based on the technical effects of the present invention, it is particularly preferable that the other additives have a high boiling point or be a component that is substantially non-volatile.

[(F1) Functional Filler]

A functional filler can be used as an additive in order to improve the mechanical properties of a cured product obtained from the curable silicone composition of the present invention, to improve flame retardancy, or the like. Examples of these functional fillers include inorganic fillers, organic fillers, and mixtures thereof. Examples of the inorganic fillers include a reinforcing filler, a pigment, a thermally conductive filler, an electrically conductive filler, a phosphor, and mixtures of at least two of these, and examples of organic fillers include a silicone resin filler, a fluorine resin filler, and a polybutadiene resin filler. Note that the shape of these fillers is not particularly limited and may be spherical, spindle-shaped, flat, needle-shaped, amorphous, or the like.

The type and amount of functional filler are preferably selected to be within a range in which the curable silicone composition of the present invention can be melted and kneaded and within a range that enables the technical effects of the present invention (such as curing properties, mechanical properties after curing, weather resistance, and the like). One preferred form of the curable silicone composition of the present invention is one that is substantially free of functional fillers.

[(F2) Adhesion Imparting Agent]

The composition of the present invention may contain an adhesion imparting agent so long as the object of the present invention is not impaired. Such adhesion imparting agents are common to components suitably exemplified by the present applicant in the international patent application (PCT/JP2020/12027), and reaction mixtures of epoxy group-containing organoalkoxysilane and amino group-containing organoalkoxysilane disclosed in Japanese Examined Patent Publication S52-8854 and Japanese Unexamined Patent Application H10-195085, and particularly carbasilatrane derivatives having a silicon atom-bonded alkoxy group or silicon atom-bonded alkenyl group in one molecule, silatrane derivatives having an alkoxysilyl group-containing organic group, and the like can be preferably used in addition to 3-glycidoxypropyltrimethoxysilane and other silane compounds, organosiloxane oligomers, and alkyl silicates. The amount of the adhesion imparting agent is not limited, but is preferably within a range of 0.01 to 10 parts by mass relative to 100 parts by mass total of the present composition.

[Other Optional Components]

Furthermore, the composition may contain, as other optional components, heat resistance agents such as iron oxide (red iron oxide), cerium oxide, cerium dimethyl silanolate, fatty acid cerium salt, cerium hydroxide, zirconium compound, and the like, and in addition, dyes, pigments other than white, flame retardancy imparting agents, and the like.

[Manufacturing Method and Form of Filling Cartridge, Pail and Drum]

The curable silicone composition of the present invention can be manufactured by heating and melting, and then uniformly mixing components (A) to (D), along with (E) and other optional components, and then cooling if necessary. However, the composition may be manufactured by any method, not limited to this method. The mixer that can be used with this manufacturing method is not particularly limited, and examples can include batch type mixers with heating and cooling functions, such as kneaders, Banbury mixers, Henschel mixers, planetary mixers, two-roller mills, three-roller mills, Ross mixers, Labo Plastomills, and the like; and continuous type heating and kneading devices with heating and cooling functions, such as single-screw extruders, twin-screw extruders, and the like. The curable silicone composition according to the present invention is particularly suitable for use in a form of being filled in cartridges, pails, or drums, heated, and dispensed using a dispenser; therefore, it is particularly preferable to manufacture the composition using a single-shaft or twin-shaft continuous mixer, from the perspective of being able to continuously fill the cartridge, pail, or drum.

The curable silicone composition according to the manufacturing method of the present invention must be used in a form filled in dispensing cartridges, pails, or drums. The cartridges containing the curable silicone composition are obtained by continuously filling the cartridge, pail, or drum with the curable silicone composition using a manufacturing method including process P1 and process P2 described below.

Process P1: a process mixing components of the curable hot-melt silicone composition, preferably at a temperature of 50° C. or higher;

Process P2: a process of continuously filling cartridges, pails or drums with the heated and melted mixture obtained in process P1 by dispensing through a nozzle;

[Process P1]

Process P1 is a process of kneading the components of the composition of the present invention while heating and melting. By heating and kneading the heat-meltable mixture at a temperature above the softening point, suitably in a temperature range of 50° C. to 200° C., the entire composition is melted or softened and mixed, and thus the components included in the mixture can be uniformly mixed. The mixture obtained in process P1 is a uniformly mixed composition, which can be filled into cartridges, pails, or drums in process P2 to produce cartridges, pails, or drums containing the curable silicone composition for hot dispensing. On the other hand, if the temperature at which the mixture is heated is less than the lower limit described above, the mixture will not be sufficiently softened, and it may be difficult to obtain a melted or softened mixture in which each component is uniformly mixed throughout, even by using mechanical force. If a mixture in which the components are not uniformly mixed is filled into the cartridge in process P2, a uniformly mixed curable silicone composition cannot be obtained, and problems such as inferior curing, inferior melting, or the like may occur during use. Conversely, if the temperature at which the mixture is heated exceeds the aforementioned upper limit, a hydrosilylation reaction may occur during mixing as an unintended side reaction or the like of the photoactive hydrosilylation reaction catalyst, which is component (D), and thus the entire mixture can be significantly thickened or cured to lose hot-melt properties, or a cured product will be formed, neither of which is preferable. Furthermore, in order to suppress unintended side reactions, a method may be and is preferably used where component (D), which is a photoactive hydrosilylation reaction catalyst, is not mixed with the other components from the beginning in process P1, but rather component (D) is added after sufficiently mixing the mixture of other components, and the heating temperature is lowered to a range where kneading is possible when adding component (D), or the like.

As described above, the kneading device used in process P1 is not limited and can be selected based on the work efficiency in terms of processing time and the ability to control shear heating. In particular, a continuous heating and kneading device such as single-screw extruders, twin-screw extruders, and the like equipped with heating and cooling functions are preferably used because of the short processing time and favorable work efficiency.

[Process P2]

Process P2 is a process of filling the cartridge for dispensing with the mixture after heating and melting obtained in process P1. If a continuous kneading device is used in process P1, excellent production efficiency can be achieved because the filling can be continuously performed. In this case, a nozzle that matches the inner diameter of the cartridge to be filled is attached to the outlet of a continuous kneading device, and by inserting the nozzle into the cartridge, the cartridge can be automatically filled by the pressure of dispensing the uniformly mixed composition from the nozzle. When the cartridge is completely filled, the cartridge is removed from the nozzle and the nozzle is continuously inserted into the next cartridge, allowing the filling process to be performed consecutively to match the speed of dispensing the composition.

Process P2 may be performed manually or may be automated. With the continuous method described above, the filling rate in process P2 of the mixture obtained in process P1 can be designed based on the scale of manufacture. As an example, the mixture obtained in process P1 can be continuously filled into the cartridges at a feed rate of 1 to 10 kg/hour, but needless to say, the filling condition is not limited accordingly. On the other hand, when filling a pail or drum, the composition continuously dispensed from the kneading device can be received directly to fill the pail or drum.

[Dispensing Cartridge, Pail, or Drum, and Use Thereof]

The curable silicone composition according to the present invention can be filled into a dispensing cartridge, pail, or drum in the aforementioned process P2, or the like, and can be suitably used for hot dispensing. Heat-resistant cartridges for dispensing can be and are preferably used in process P2. The filling and dispensing processes are performed at approximately 100° C., so plastic cartridges with a heat resistance of approximately 120° C. can be used. Furthermore, a metal cartridge made of aluminum, for example, may also be used. On the other hand, if a cartridge that does not have heat resistance is used, problems such as deformation of the cartridges or the like may occur when used at a high temperature of 100° C. or higher, either during filling or during heat dispensing as described below. Furthermore, the pails and drums are preferably made of metal, and a type that can be used in the hot melter described above is preferably.

Furthermore, the curable silicone composition according to the present invention may be manufactured using the organopolysiloxane resin microparticles of component (A) as a raw material in process P1 or the like (method A), or may be manufactured by dispersing organopolysiloxane resin in solid form at room temperature along with, optionally, a chain diorganopolysiloxane dispersed in an organic solvent, and removing the organic solvent, such that the resulting solid with hot-melt properties may be used as raw material (hot-melt bulk method) (method B).

Specifically, the former manufacturing method (method A) includes the following processes:

process PA1: a process of mixing organopolysiloxane resin microparticles and other raw materials (in some cases a functional filler may be included);

process PA2: a process of kneading the mixture obtained in process PA1 while heating and melting at a temperature of 120° C. or lower.

Similarly, the latter manufacturing method (method B) includes the following processes:

process PB1: a process of obtaining a hot-melt solid by removing an organic solvent at a temperature of 150° C. or higher from a solution in which (A) an organopolysiloxane resin in a solid state at room temperature and (B) a chain diorganopolysiloxane or the like are dispersed or dissolved in an organic solvent;

process PB2: a process where after adding the curing agent components (C+D) to the hot-meltable solids obtained in process PB1, the mixture is kneaded while heating and melting at a temperature 120° C. or lower.

[Hardness of Cured Product and Compatible Use Form]

A preferred hardness of the cured product obtained by curing the curable silicone composition of the present invention can be classified into two categories depending on an application thereof. When adherends are adhered to both surfaces of the curable silicone composition of the present invention (in other words, with use as an adhesive), the Type A durometer hardness specified in "Durometer Hardness Test Method for Plastics" of JIS K 7215-1986 is preferably 30 or higher. This is because if the hardness is at or below the lower limit described above, the cured product tends to be too soft and brittle. On the other hand, if the application thereof is substrate sealing or encapsulation (in other words an encapsulant-like use), the Type A durometer hardness is preferably 40 or higher. This is because if the hardness is at or below the lower limit described above, the surface of the cured product becomes sticky, and thus handling performance is reduced.

EXAMPLES

The curable silicone composition of the present invention and manufacturing method thereof are described below in detail using examples and comparative examples. Note that in the following description, Me, Vi, and Ph in the average unit formula represent methyl, vinyl, and phenyl groups, respectively. Furthermore, the melt viscosity, dispensability, stability of the composition during dispensing, and hardness of the cured product were measured for the curable silicone compositions of each example and comparative example by the following methods. The results are shown in Table 2.

[Melt Viscosity at 100° C.]

The melt viscosity of the curable silicone composition at 100° C. was measured using a Koka-type flow tester CFT-500EX (manufactured by Shimadzu Corporation) using a nozzle with a 1.0 mm outlet nozzle diameter, a 10 mm intake nozzle diameter, and a nozzle length of 20 to 30 mm, at 2.5 MPa pressure.

[Hot Dispensing Properties (Initial)]

A cartridge filled with the curable silicone composition was placed in a temperature control unit (THERMO MASTER TCU-02 manufactured by Musashi Engineering) attached to a desktop coating robot (SHOT mini 200Sx manufactured by Musashi Engineering), and the temperature setting of the temperature control unit was set to 100° C. to warm the cartridge. After the cartridge was sufficiently warmed, a test was conducted to determine whether the composition could be smoothly dispensed by dispensing on a glass plate using a digital dispenser (ML-606GX manufactured by Musashi Engineering Co., Ltd.) at a pressure of 0.5 MPa.

[Hot Dispensing Properties (after 5 Hours at 100° C.)/Stability of Composition During Dispensing]

A cartridge filled with the curable silicone composition was placed in a temperature control unit (THERMO MASTER TCU-02 manufactured by Musashi Engineering) attached to a desktop coating robot (SHOT mini 200Sx manufactured by Musashi Engineering), and the temperature setting of the temperature control unit was set to 100° C., and maintained for 5 hours. Next, a test was conducted to determine whether the composition could be smoothly dispensed by dispensing on a glass plate using a digital dispenser (ML-606GX manufactured by Musashi Engineering Co., Ltd.) at a pressure of 0.5 MPa.

[Hardness of Cured Product]

The curable silicone composition was cured under predetermined curing conditions to form a cured product. The hardness of the cured product was measured by a type A durometer specified in JIS K 7215-1986 "Durometer Hardness Testing Method for Plastics."

Reference Examples 1 to 3: Preparation of Hot-Melt Siloxane Mixture

In each reference example, the following organopolysiloxane resins (a1), (a2), (a'), and linear organopolysiloxanes (b), (b') {hereinafter referred to as components (a1), (a2), (a'), (b), (b')} were mixed to prepare siloxane mixtures with hot-melt properties (hereinafter referred to as mixtures 1 to 3). Note that the low molecular weight organopolysiloxane components removed by the methods described in the reference examples include a $M_4Q$ structure and the like.

Component (a1): An organopolysiloxane resin that is a white solid at 25° C., expressed by average unit formula:

$$(Me_2ViSiO_{1/2})_{0.05}(Me_3SiO_{1/2})_{0.39}(SO_{4/2})_{0.56}(HO_{1/2})_{0.02}$$

(amount of vinyl group=1.9 mass %)

Component (a2): An organopolysiloxane resin that is a white solid at 25° C. expressed by the average unit formula: $(Me_3SiO_{1/2})_{0.44}(SiO_{4/2})_{0.56}(HO_{1/2})_{0.02}$ (vinyl group content=0 mass %)

Component (a'): An organopolysiloxane resin in a white solid state at 25° C., expressed by the average unit formula:

$$(Me_3SiO_{1/2})_{0.44}(SiO_{4/2})_{0.56}(HO_{1/2})_{0.02}.$$

Component (b): dimethylpolysiloxane (amount of vinyl groups=0.09 mass %) blocked at both molecular chain ends with dimethylvinylsiloxy groups, expressed by formula $ViMe_2SiO(Me_2SiO)_{800}SiViMe_2$ Component (b'): dimethylpolysiloxane blocked at both molecular chain ends with trialkoxysiloxy groups, expressed by formula: $(OMe)_3SiO(Me_2SiO)_{800}Si(OMe)_3$ In each reference example, components (a1), (a2), (a'), (b), and (b') in the amounts (kg) shown in Table 1 below were dissolved in 4.00 kg of xylene in a pail can using a three-one motor. The resulting solution was fed into a twin-screw extruder with the maximum attainable temperature set at 230° C. The xylene and low molecular weight organopolysiloxane components were removed under a vacuum degree of −0.08 MPa, resulting in transparent hot-melt mixtures 1 to 7. The mixtures 1 to 7 were placed in a cylindrical pail can and cooled to a solid state. The results of measuring the amount of volatile components of each mixture at 200° C. for 1 hour are shown in Table 1 as "Amount of volatile components (mass %)".

TABLE 1

| | Reference Example No. | | |
|---|---|---|---|
| Component (kg) | 1 | 2 | 3 |
| (a1) | 2.35 | 3.04 | |
| (a2) | 3.17 | 2.49 | |
| (a') | | | 5.29 |
| (b) | 3.99 | 3.88 | |
| (b') | | | 4.45 |
| Amount of volatile components (mass %) | 0.7 | 0.7 | 0.7 |

Preparation Examples 1 to 3

In the following examples and comparative examples, the following compounds were used in addition to mixtures 1 to 3 and component (b). A twin-screw extruder of the form depicted in FIG. 1 was used in preparing the compositions for each example.

Furthermore, the properties of each of the obtained curable silicone compositions are shown in Table 2.

Component (c1): an organohydrogen polysiloxane expressed by $$(PhSiO_{3/2})_{0.4}(HMe_2SiO_{1/2})_{0.6}$$

(amount of volatile components during aging in oven at 100° C. under atmospheric pressure for one hour, in other words, mass loss ratio, of 3.4 mass %)

Component (c2): an organohydrogen polysiloxane expressed by $$(HMe_2SiO_{1/2})_{0.52}(Me_2SiO_{2/2})_{0.15}(SiO_{4/2})_{0.33}$$

(amount of volatile components during aging in oven at 100° C. under atmospheric pressure for one hour, in other words, mass loss ratio, of 2.9 mass %)

Component (c'): an organohydrogen polysiloxane expressed by $$Me_3SiO(Me_2SiO)_{37}(MeHSiO)_{37}SiMe_3$$

(amount of volatile components during aging in oven at 100° C. under atmospheric pressure for one hour, in other words, mass loss ratio, of 2.6 mass %)

Component (c"): an organopolysiloxane-containing a 3-mercaptopropyl group expressed by formula: $Me_3SiO(Me_2SiO)_{29}[Me(HSC_3H_6)SiO]_3SiMe_3$ Component (d): (Methylcyclopentadienyl) trimethyl platinum (IV) complex Component (d'): a 1,3-divinyltetramethyldisiloxane solution of a 1,3-divinyltetramethyldisiloxane complex of platinum Component (e): Methyltris-1,1-dimethyl-2-propynyloxysilane (boiling point=245° C. (1013.25 hPa))

Preparation Example 1

Mixture 1 was fed into a twin-screw extruder ("2" in FIG. 1) at 170° C. using a hot melter (VersaPail Melter manufactured by Nordson "1" in FIG. 1) for cylindrical pails at 9.51 kg/hr.

Next, a mixture containing component (c1) at a rate of 0.34 kg/hr and component (e) at 500 ppm with regard to the total of the composition was fed using pump 3-*a* depicted in FIG. 1. The set temperature of the feeding part was 150° C.

Next, a mixture containing component (b) at 0.15 kg/hr and component (d) (an amount that provides 10 ppm by mass of platinum metal based on the entire composition) was fed by the pump 3-*b* depicted in FIG. 1 (the set temperature of the feeding part was 80° C.), where the degree of vacuum in the extruder was −0.08 MPa, to perform degassing melt-kneading.

The outlet temperature of the twin-screw extruder was 80° C., and the mixture was in the form of a semi-solid softened material at that temperature. A nozzle with a diameter of 2.5 cm and a length of 13 cm was attached to the outlet of the twin-screw extruder, and the resulting mixture was continuously filled into a heat-resistant cartridge (Unity HiTemp syringe, manufactured by Nordson) with a capacity of 30 mL. The melt viscosity of the resulting curable hot-melt silicone composition at 100° C. was 6 Pa·s.

Preparation Example 2

Mixture 2 was fed into a twin-screw extruder ("2" in FIG. 1) at 170° C. using a hot melter (VersaPail Melter manufactured by Nordson "1" in FIG. 1) for cylindrical pails at 9.41 kg/hr. Next, a mixture containing component (c2) at a rate of 0.440 kg/hr and component (e) at 500 ppm with regard to the total of the composition was fed using pump 3-*a* depicted in FIG. 1. The set temperature of the feeding part was 150° C.

Next, a mixture containing component (b) at 0.15 kg/hr and component (d) (an amount that provides 10 ppm by mass of platinum metal based on the entire composition) was fed by the pump 3-*b* depicted in FIG. 1 (the set temperature of the feeding part was 80° C.), where the degree of vacuum in the extruder was −0.08 MPa, to perform degassing melt-kneading.

The outlet temperature of the twin-screw extruder was 80° C., and the mixture was in the form of a semi-solid softened material at that temperature. A nozzle with a diameter of 2.5 cm and a length of 13 cm was attached to the outlet of the twin-screw extruder, and the resulting mixture was continuously filled into a heat-resistant cartridge (Unity HiTemp syringe, manufactured by Nordson) with a capacity of 30 mL. The melt viscosity of the resulting curable hot-melt silicone composition at 100° C. was 6 Pa·s.

Preparation Example 3

Mixture 3 was fed into a twin-screw extruder ("2" in FIG. 1) at 170° C. using a hot melter (VersaPail Melter manufactured by Nordson "1" in FIG. 1) for cylindrical pails at 9.74 kg/hr. Next, isobutyltrimethoxysilane was fed at a rate of 0.110 kg/hr from pump 3-*b* depicted in FIG. 1.

The set temperature of the feeding part was 150° C.

Next, a mixture containing the dimethylpolysiloxane blocked at both ends of the molecular chain with trimethoxysiloxy groups expressed by $$(OMe)_3SiO(Me_2SiO)_{800}Si(OMe)_3$$

at 0.15 kg/hr and tetra-tertiary butyl titanium (an amount of 800 ppm by mass as titanium metal in the entire composition) was fed by the pump 3-*a* in FIG. 1 (set temperature of feeding part was 80° C.), and degassing melt-kneading was performed with the degree of vacuum in an extruder at −0.08 MPa.

The outlet temperature of the twin-screw extruder was 80° C., and the mixture was in the form of a semi-solid softened material at that temperature. A nozzle with a diameter of 2.5 cm and a length of 13 cm was attached to the outlet of the twin-screw extruder, and the resulting mixture was continuously filled into a heat-resistant cartridge (Unity HiTemp syringe, manufactured by Nordson) with a capacity of 30 mL. The melt viscosity of the resulting curable hot-melt silicone composition at 100° C. was 5 Pa·s.

Example 1

A cartridge filled with the curable silicone composition obtained in Preparation Example 1 was placed in a temperature control unit (THERMO MASTER TCU-02 manufactured by Musashi Engineering) attached to a desktop coating robot (SHOT mini 200Sx manufactured by Musashi Engineering), and the temperature setting of the temperature control unit was set to 100° C. to warm the cartridge. After the cartridge was sufficiently warmed and the composition was dispensed on a glass plate using a digital dispenser (ML-606GX manufactured by Musashi Engineering Co., Ltd.) at a pressure of 0.5 MPa, the shape was maintained as dispensed, without dripping. The composition was irradiated with ultraviolet light at a wavelength of 365 nm at an irradiation dose of 10 J/cm$^2$ and exposed to 100° C. for 1 hour to obtain a cured product. The resulting cured product was strongly adhered to the glass substrate.

Example 2

The curable silicone composition (Preparation Example 1) was dispensed from the digital dispenser onto a glass plate similar to Example 1, and a second glass plate was overlaid and manually pressed to spread the composition. The composition was irradiated with ultraviolet light through the glass of the laminate body that was obtained at a wavelength of 365 nm at an irradiation dose of 10 J/cm$^2$ and exposed to 100° C. for 1 hour to obtain a cured product. The resulting cured product was strongly adhered to the two glass substrates.

Example 3

Similar to Example 1, the curable silicone composition (Preparation Example 1) dispensed from the digital dispenser onto an aluminum plate was irradiated with ultraviolet light with a wavelength of 365 nm at an irradiation dose of 10 J/cm$^2$, and then the second aluminum plate and the composition were laminated and manually pressed and spread. The laminate body obtained was exposed to 100° C. for 1 hour to obtain a cured product. The resulting cured product was strongly adhered to the two aluminum plates.

Example 4

Using a cartridge filled with the curable silicone composition obtained in Preparation Example 2, the curable silicone composition (Preparation Example 2) was dispensed onto a glass plate from a digital dispenser in the same manner as in Example 1, except that the temperature setting of the temperature control unit was 130° C. When an ultraviolet light irradiation device attached to the dispensing port was used to irradiate ultraviolet light with a wavelength of 365 nm at an irradiation dose of 10 J/cm$^2$ while dispensing, it was confirmed that the composition was cured and adhered to the glass plate when the material was applied to the glass plate and cooled in air.

Example 5

A slot die with a heatable outlet gap of 100 μm was attached to the tip end of the digital dispenser of Example 1, and the curable silicone composition obtained in Preparation Example 1 was dispensed and applied onto a glass plate at a die temperature setting of 100° C. The composition was irradiated with ultraviolet light at a wavelength of 365 nm at an irradiation dose of 10 J/cm$^2$ and exposed to 100° C. for 1 hour to obtain a cured product. The cured product obtained was strongly adhered to the glass substrate, and the film thickness was 100 μm as applied.

Comparative Example 1

Using cartridges filled with the curable silicone composition obtained in Preparation Example 3, when the curable silicone composition (Preparation Example 3) was dispensed from a digital dispenser onto a glass plate in the same manner as in Example 1, liquid dripping did not occur, and the shape was retained as dispensed. The resulting laminate body was exposed to a temperature of 100° C. for 1 hour, but curing did not complete, the surface of the cured product was sticky, and adhesion to the glass substrate was not firm.

Summary

The use of cartridges filled with a curable silicone composition containing a photoactive hydrosilylation reaction catalyst with optimized melt viscosity properties in Examples 1 to 4 according to the present invention enabled smooth and stable hot dispensing operation, and the reaction proceeded quickly after high energy beam irradiation. Therefore, it was possible to form cured product or an adhesive layer containing a cured product on the substrate. Furthermore, as shown in Examples 1 to 4, the manufacturing process of the laminate body can be flexibly designed depending on the timing of the high energy beam irradiation and the presence or absence of a second substrate.

On the other hand, with the comparative example using a curable silicone composition with a different curing system (condensation reactivity) than the example, the hot dispensing operation was possible, but sufficient curing rate and adhesive strength could not be achieved under high temperatures.

DESCRIPTION OF THE REFERENCE NUMERALS

- 1: Hot melter
- 2: Extruder
- 3-*a*: Pump
- 3-*b*: Pump
- 3-*c*: Vacuum pump
- 4: Dispensing port (may optionally be fitted with a nozzle for cartridge filling)

The invention claimed is:

1. A method of manufacturing a laminate body, the method comprising:

dispensing a curable silicone composition, that has hot-melt properties of the overall composition, has a melt viscosity at 100° C. of 50 Pa·s or less, measured by a flow tester: nozzle diameter 1 mm, pressure 2.5 MPa, and is cured by irradiation using a high energy beam, in a form filled into a dispensing cartridge, pail, or drum, onto a portion or all of a surface of at least one substrate;

wherein the curable silicone composition comprises:

(A) 100 parts by mass of organopolysiloxane resin containing the following components (A1) and (A2) at a mass ratio of from 20:80 to 90:10, where each individual component does not have hot-melt properties and is solid at 25° C., (A1) an organopolysiloxane resin having a curing reactive functional group with a carbon-carbon double bond included in a molecule, and containing siloxane units expressed by $SiO_{4/2}$ making up at least 20 mol % or more of all siloxane units, and (A2) an organopolysiloxane resin not having a curing reactive functional group with a carbon-carbon double bond included in a molecule, and containing a siloxane unit expressed by $SiO_{4/2}$ making up at least 20 mol % or more of all siloxane units;

(B) 10 to 100 parts by mass of a linear organopolysiloxane in a liquid state at 25° C., having a curing reactive functional group containing at least two carbon-carbon double bonds in a molecule;

(C) an organohydrogen polysiloxane having at least two silicon atom-bonded hydrogen atoms in a molecule, at an amount where the number of hydrogen atoms bonded to a silicon atom per one alkenyl group bonded to a silicon atom included in the entire composition is 0.5 to 20.0; and (D) a catalytic amount of a hydrosilylation reaction catalyst, which does not demonstrate activity unless irradiated with a high energy beam, but that demonstrates activity in the composition after irradiation with a high energy beam.

2. The method of manufacturing a laminate body according to claim 1, wherein an uncured curable silicone composition is provided on a portion or all of the surface of the substrate.

3. The method of manufacturing a laminate body according to claim 1, which is a method of manufacturing a laminate body having a cured product obtained by curing a curable silicone composition on a portion or all of the surface of the substrate.

4. The method of manufacturing a laminate body according to claim 1, wherein the method of manufacturing a laminate body provides a layer of the curable silicone composition or a cured product layer obtained by curing the curable silicone composition, between two or more substrates.

5. The method of manufacturing a laminate body according to claim 1, wherein the laminate body is one or more selected from electronic components, semiconductor devices or optical semiconductor devices, or a precursor thereof.

6. The method of manufacturing the laminate body according to claim 1, comprising:

(1) heating a curable silicone composition filled in a dispensing cartridge, pail, or drum to 50° C. or higher to impart fluidity; and (2) dispensing the curable silicone composition of step (1) on a portion or all of the surface of at least one substrate using a dispenser.

7. The method of manufacturing a laminate body according to claim 1, comprising:

(1) heating a curable silicone composition filled in a dispensing cartridge, pail, or drum to 50° C. or higher to impart fluidity;

(2) dispensing the curable silicone composition of step (1) onto a portion or all of the surface of at least one substrate using a dispenser;

(3) irradiating the curable silicone composition dispensed from the dispenser with a high energy beam, either at the same time as step (2) or after step (2); and (4) curing the curable silicone composition either at the same time as step (3) or after step (3).

8. The method of manufacturing a laminate body according to claim 6, wherein step (1) is a step in which the curable silicone composition filled in a dispensing cartridge, pail, or drum is heated to 50° C. or higher using a dispenser equipped with a heating unit to provide fluidity.

9. The method of manufacturing a laminate body according to claim 6, wherein an outlet of the dispenser in step (2) is connected to a slot die heated to 50° C. or higher, and dispensing is performed in the form of a film or a sheet to coat the substrate at a predetermined thickness.

10. The method of manufacturing a laminate body according to claim 7, wherein the irradiation with the high energy beam in step (3) is a step of irradiating the curable silicone composition with the high energy beam, either directly or through another substrate, and with the method further comprising, after step (2), but before step (4):

(5) closely attaching the curable silicone composition dispensed from the dispenser to another substrate.

11. The method of manufacturing a laminate body according to claim 10, wherein step (5) is a step of closely attaching another substrate to the curable silicone composition dispensed from the dispenser onto the substrate in step (2) in a uncured state or in a semi-cured state in which the curing reaction is proceeding by applying an external force, and may be a step accompanied by a change in the shape of the dispensed curable silicone composition.

12. The method of manufacturing a laminate body according to claim 7, wherein step (1) is a step in which the curable silicone composition filled in a dispensing cartridge, pail, or drum is heated to 50° C. or higher using a dispenser equipped with a heating unit to provide fluidity.

13. The method of manufacturing a laminate body according to claim 7, wherein an outlet of the dispenser in step (2) is connected to a slot die heated to 50° C. or higher, and dispensing is performed in the form of a film or a sheet to coat the substrate at a predetermined thickness.

* * * * *